(12) United States Patent
Yamada et al.

(10) Patent No.: US 11,853,464 B2
(45) Date of Patent: Dec. 26, 2023

(54) STORAGE DEVICE AND DATA TAMPERING DETECTION METHOD

(71) Applicant: KIOXIA CORPORATION, Tokyo (JP)

(72) Inventors: Naoko Yamada, Yokohama Kanagawa (JP); Teruji Yamakawa, Tokyo (JP)

(73) Assignee: Kioxia Corporation, Tokyo (JP)

( * ) Notice: Subject to any disclaimer, the term of this patent is extended or adjusted under 35 U.S.C. 154(b) by 770 days.

(21) Appl. No.: 16/425,805

(22) Filed: May 29, 2019

(65) Prior Publication Data

US 2020/0050799 A1 Feb. 13, 2020

(30) Foreign Application Priority Data

Aug. 9, 2018 (JP) .................................. 2018-150445

(51) Int. Cl.
  *G06F 21/64* (2013.01)
  *G06F 21/44* (2013.01)
  *G06F 3/06* (2006.01)
  *G06F 21/60* (2013.01)

(52) U.S. Cl.
  CPC ............ *G06F 21/64* (2013.01); *G06F 3/0623* (2013.01); *G06F 3/0659* (2013.01); *G06F 3/0673* (2013.01); *G06F 21/44* (2013.01); *G06F 21/602* (2013.01)

(58) Field of Classification Search
None
See application file for complete search history.

(56) References Cited

U.S. PATENT DOCUMENTS

| 6,895,507 B1 | 5/2005 | Teppler |
| 7,559,090 B2 | 7/2009 | Takagi et al. |
| 2005/0033973 A1* | 2/2005 | Kamada ................... G06F 21/64 |
| | | 713/193 |
| 2007/0226412 A1* | 9/2007 | Morino .................... G06F 21/10 |
| | | 711/113 |
| 2015/0370726 A1* | 12/2015 | Hashimoto ......... G06F 12/1009 |
| | | 711/163 |
| 2017/0323121 A1* | 11/2017 | Liu .......................... G06F 21/78 |

FOREIGN PATENT DOCUMENTS

| JP | 4023654 B2 | 12/2007 |
| JP | 4074620 B2 | 4/2008 |

* cited by examiner

*Primary Examiner* — Alexander Lagor
*Assistant Examiner* — Felicia Farrow
(74) *Attorney, Agent, or Firm* — Kim & Stewart LLP

(57) ABSTRACT

A storage device includes a storage and a controller configured to execute control of the storage based on a command from a host device. The controller is configured to generate a verifier of data stored in the storage in response to a first command related to the data from the host device, and transmit the verifier of the data to the host device in response to a second command related to the data from the host device.

7 Claims, 31 Drawing Sheets

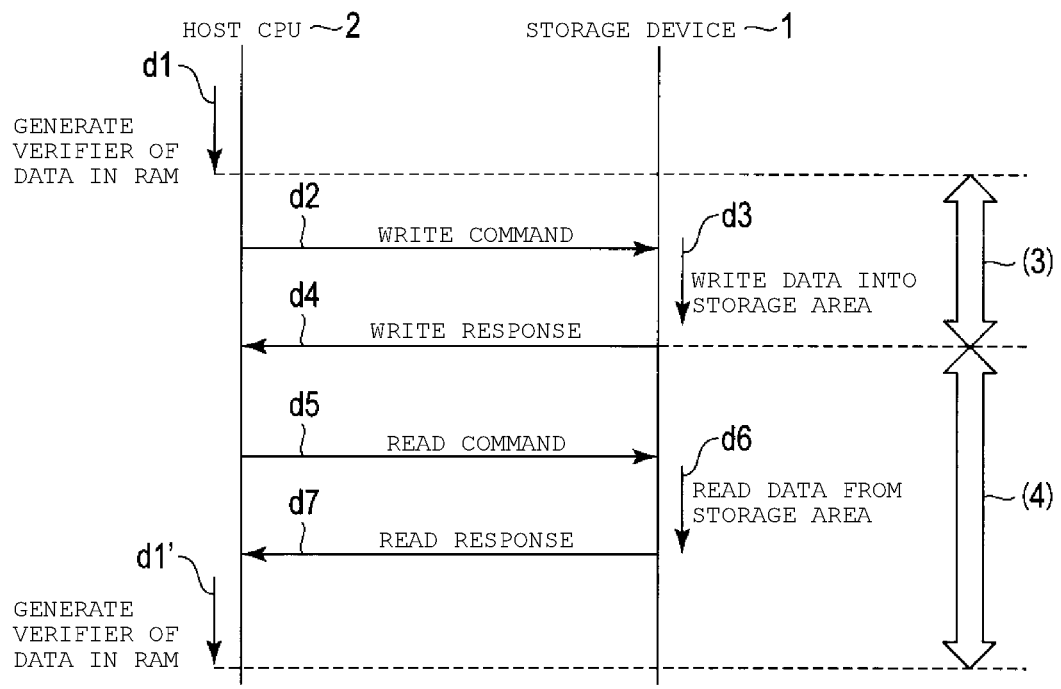
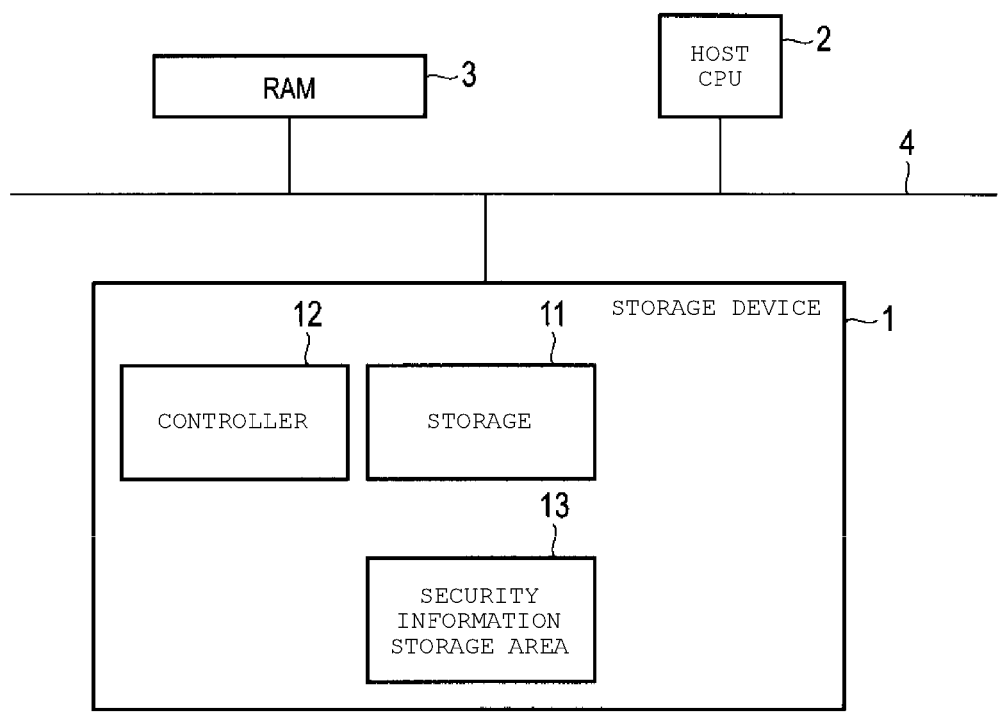

STORAGE DEVICE AND DATA TAMPERING DETECTION METHOD

CROSS-REFERENCE TO RELATED APPLICATION

This application is based upon and claims the benefit of priority from Japanese Patent Application No. 2018-150445, filed Aug. 9, 2018, the entire contents of which are incorporated herein by reference.

FIELD

Embodiments described herein relate generally to a storage device and a data tampering detection method.

BACKGROUND

For example, along with advances in electronic control technology, the importance of verification of data (including a program) stored in a storage device, for example, to protect against tampering, is increasing. Attacks involving data tampering can be performed not only on a storage device but also on a host side memory that accesses the storage device.

DESCRIPTION OF THE DRAWINGS

FIG. 13 is a diagram illustrating a sequence in which the host CPU performs verification of data written in the storage device of the second embodiment.

FIG. 14 is a diagram illustrating a configuration example and a connection example of a storage device of a third embodiment.

DETAILED DESCRIPTION

Embodiments provide a storage device and a data tampering detection method that achieve reduction of load on a host performing the data tampering detection.

According to an embodiment, a storage device includes a storage and a controller configured to execute control of the storage based on a command from a host device. The controller is configured to generate a verifier of data stored in the storage in response to a first command related to the data from the host device, and transmit the verifier of the data to the host device in response to a second command related to the data from the host device.

Hereinafter, embodiments will be described with reference to the drawings.

First Embodiment

First, the first embodiment will be described.

Figure 1:
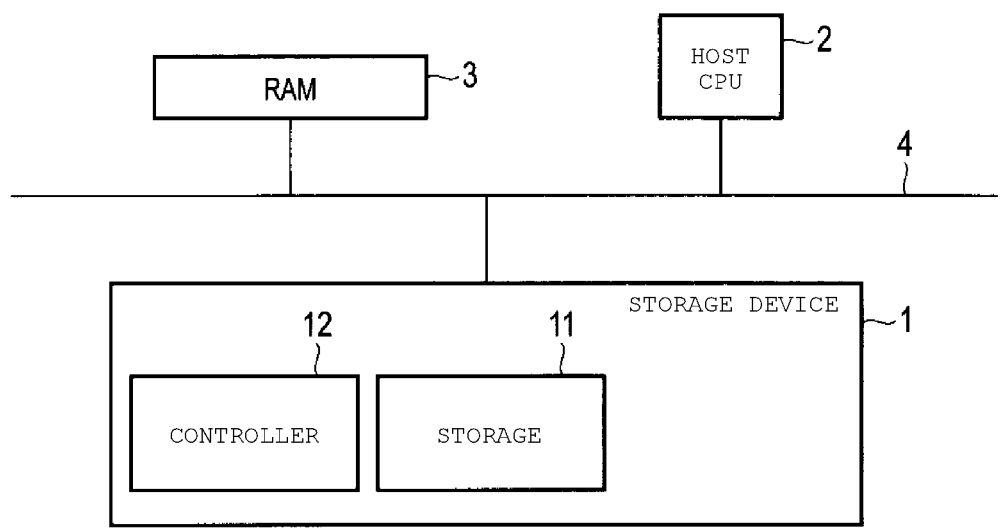
FIG. 1 is a diagram illustrating a configuration example and a connection example of a storage device of a first embodiment.

FIG. 1 is a diagram illustrating a configuration example and a connection example of a storage device 1 of a first embodiment.

As illustrated in FIG. 1, the storage device 1 includes a storage 11, for example, a flash memory or a magnetic disk, and a controller 12. The controller 12 may be one or more systems on a chip (SoCs) or one or more application specific integrated circuits (ASICs). A storage device 1 is connected to a host CPU 2 and a RAM 3 via a bus 4. The host CPU 2 issues a command to the storage device 1 and writes data in the RAM 3 into the storage device 1 or loads data read from the storage device 1 into the RAM 3. The host CPU 2 loads, for example, a program from the storage device 1 into the RAM 3 and executes the program and operates according to instructions in the program. The controller 12 executes access to the storage 11 based on a command issued by the host CPU 2. The host CPU 2 can also issue a command to the storage device 1 to perform processing other than writing and reading of data. In other words, the controller 12 can also execute processing other than accessing the storage 11 based on the command from the host CPU 2.

Figure 2:
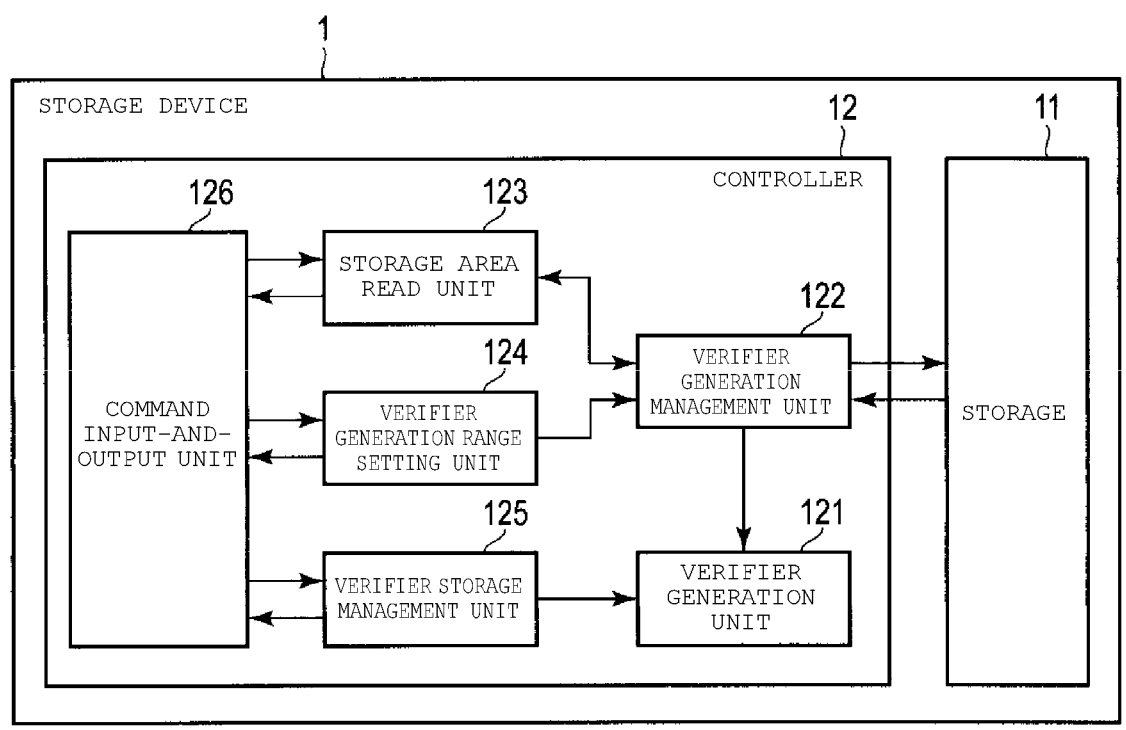
FIG. 2 is a block diagram illustrating a functional configuration of the storage device of the first embodiment.

FIG. 2 is a block diagram illustrating a functional configuration of the storage device 1 of the first embodiment.

As described above, the storage device 1 includes the storage 11 and the controller 12. As illustrated in FIG. 2, the controller 12 includes a verifier generation unit 121, a verifier generation management unit 122, a storage area read unit 123, a verifier generation range setting unit 124, a verifier storage management unit 125, and a command input-and-output unit 126. The function of each of these units may be implemented by executing a program stored in a memory incorporated in the controller 12, by a processor incorporated in the controller 12, or may be implemented as a dedicated integrated circuit. That is, the function of each of these units may be implemented by software and may also be implemented by hardware. In addition, a part of the function may be implemented by software and the remaining part may be implemented by hardware.

The verifier generation unit 121 generates a verifier of data. Here, the data may be a program stored in the storage 11. As a method of generating the verifier, any method may be used, and SHA256 is a typical method. The verifier generation management unit 122 manages generation of the verifier of data read from the storage 11. More specifically, the verifier generation management unit 122 requests the verifier generation unit 121 to generate a verifier of read data at a predetermined timing. When a data read command is issued from the host CPU 2, the storage area read unit 123 reads data from an area designated by the command from the storage 11. When a verifier generation range setting command is issued from the host CPU 2, the verifier generation range setting unit 124 requests the verifier generation management unit 122 to set the area on the storage 11 designated by the command as a verifier generation range. For setting the verifier generation range, for example, in a case where a plurality of partitions are created in the storage 11, any partition is designated. The setting of the verifier generation range may be performed by designation in a logical black address (LBA) range, designation in a namespace, or the like. In a case where a plurality of ranges are provided based on, for example, the trusted computing group (TCG) standard, any range is designated for the setting of the verifier generation range. When a partition is designated, data stored in the partition will be a generation target of a verifier. A plurality of verifier generation ranges may be set. When a verifier acquisition command is issued from the host CPU 2, the verifier storage management unit 125 acquires a verifier generated by the verifier generation unit 121 for the data designated by the command from the verifier generation unit 121. Designation of the data in the verifier acquisition command is performed, for example, by attaching, to the command as parameters, an identifier assigned to the verifier generation range when issuing the verifier generation range setting command and information indicating data storage area. The information indicating the data storage area is, for example, identification information such as a logical address, a partition number, a namespace number, a range number, and the like. The command input-and-output unit 126 controls transmission and reception of input and output of commands between the host CPU 2 and the storage device 1.

That is, the storage device 1 of the first embodiment executes processing corresponding to the verifier generation range setting command and the verifier acquisition command as a process other than the access to the storage 11 described above.

Figure 3:
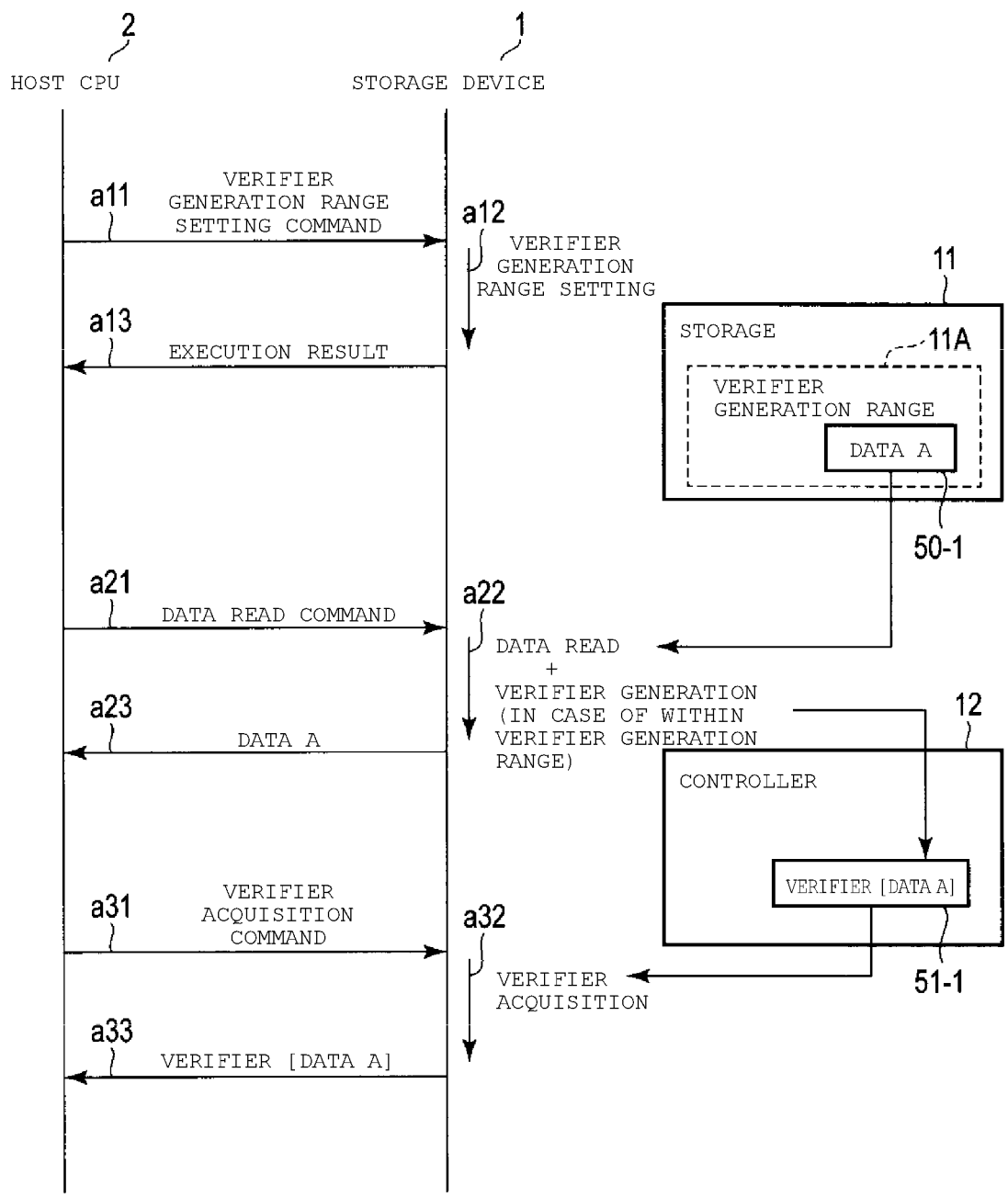
FIG. 3 is a diagram for explaining a flow of data tampering detection in the storage device of the first embodiment.

Here, with reference to FIG. 3, a flow of processing of the storage device 1 and the host CPU 2 for verifying data to protect against tampering, including issuance of the verifier generation range setting command and the verifier acquisition command, will be described.

The host CPU 2 first issues a verifier generation range setting command to the storage device 1 (a11). The storage device 1 which received the verifier generation range setting command sets an area on the designated storage 11 as a verifier generation range 11A (a12). The storage device 1 responds to the host CPU 2 that the verifier generation range 11A has been set (a13).

Thereafter, the host CPU 2 issues a data read command for reading data (data A 50-1) within the verifier generation range 11A to the storage device 1 (a21). When the data read command is received, the storage device 1 reads the data on the area designated by the command from the storage 11 and determines whether or not the area is within the verifier generation range 11A. When it is determined that the area is within the verifier generation range 11A, the storage device 1 generates a verifier (a verifier [data A] 51-1) of the data (a22). This verifier is stored, for example, in an area allocated in the memory of the controller 12 by the verifier storage management unit 125, together with an identifier of the verifier generation range 11A and a logical address indicating a logical storage area of the data. The storage device 1 transfers the read data (data A 50-1) to the host CPU 2 (a23).

In the case of checking whether the data read from the storage device 1, more specifically, the data read from the verifier generation range 11A is tampered with, the host CPU 2 issues a verifier acquisition command to the storage device 1 (a31). When receiving the data read command, the storage device 1 acquires a verifier generated when receiving the data read command (a32) and transmits the verifier to the host CPU 2 (a33). The host CPU 2 compares the verifier generated from the data in the RAM 3 before being written into the storage device 1 and the verifier acquired from the storage device 1 and checks whether the data has been tampered with.

That is, the storage device 1 of the first embodiment generates a verifier when reading data from a verifier generation range 11A to provide integrity verification method of the data read from the verifier generation range 11A while reducing overhead of the host CPU 2 relating to generation of the verifier for the data stored in the storage device 1.

Figure 4:
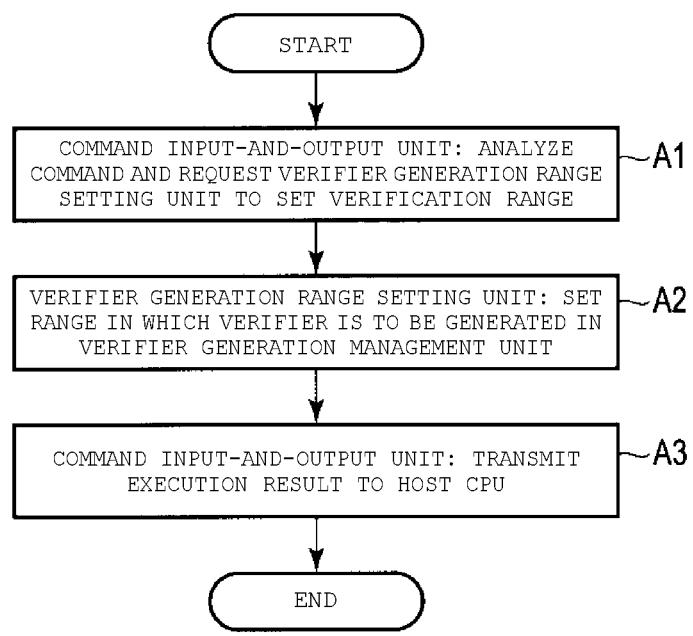
FIG. 4 is a flowchart illustrating a processing procedure when receiving a verifier generation range setting command in the storage device of the first embodiment.

FIG. 4 is a flowchart illustrating a processing procedure when receiving a verifier generation range setting command in the storage device 1.

When the verifier generation range setting command is received, the command input-and-output unit 126 analyzes the command and requests the verifier generation range setting unit 124 to set a verifier generation range (Step A1). The verifier generation range setting unit 124 which received the request sets a range in the storage 11 for generating a verifier in the verifier generation management unit 122 (Step A2). If the setting of the verifier generation range is completed, the command input-and-output unit 126 transmits the execution result to the host CPU 2 (Step A3).

Figure 5:
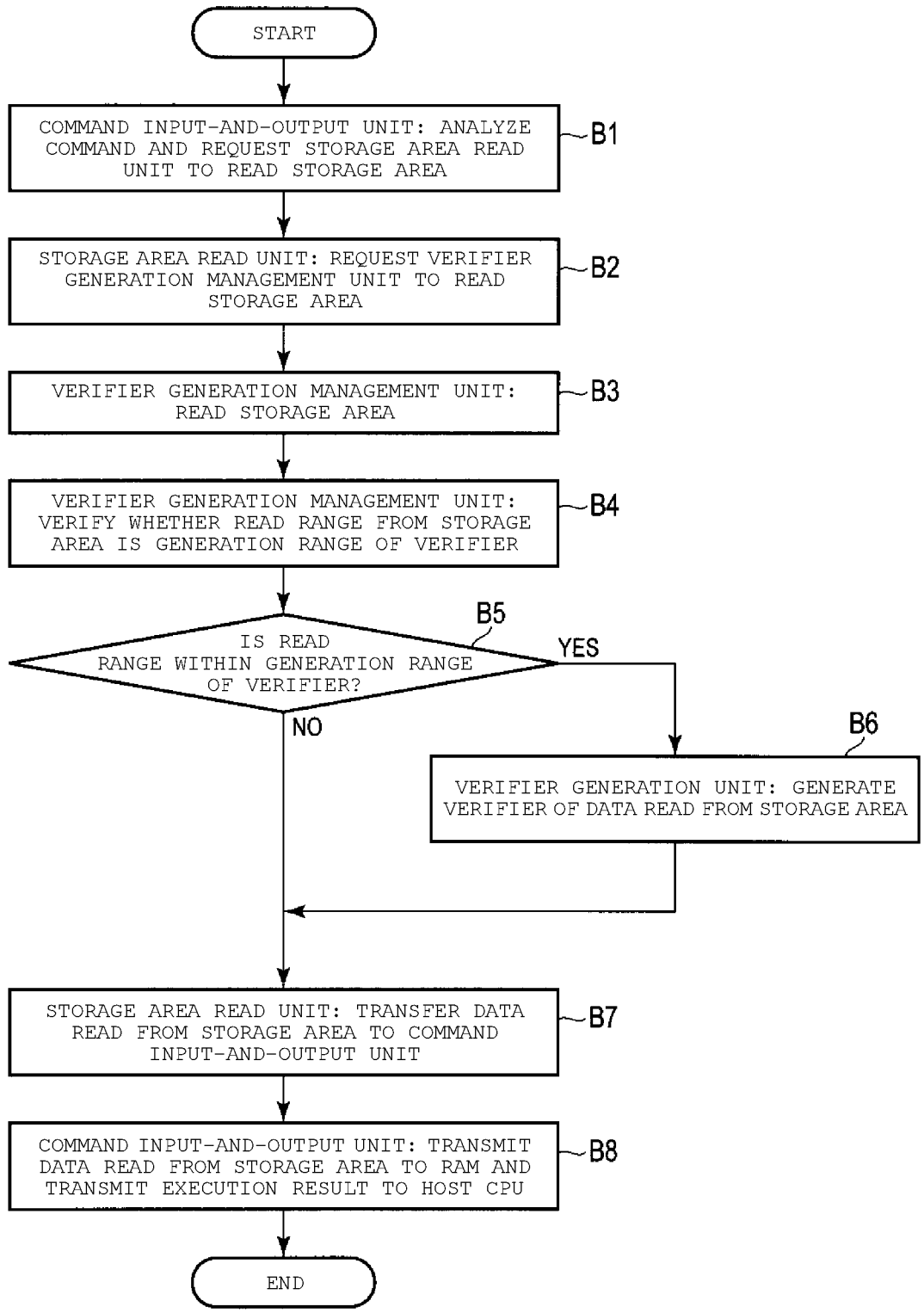
FIG. 5 is a flowchart illustrating a processing procedure when receiving a data read command in the storage device of the first embodiment.

FIG. 5 is a flowchart illustrating a processing procedure when receiving a data read command in the storage device 1.

When the data read command is received, the command input-and-output unit 126 analyzes the command and requests a storage area read unit 123 to read data stored in the designated area in the storage 11 (Step B1). The storage area read unit 123 which received the request requests the verifier generation management unit 122 to read the data stored in the designated area in the storage 11 (Step B2). The verifier generation management unit 122 reads the data stored in the designated area in the storage 11 (Step B3).

The verifier generation management unit 122 verifies whether the read range of the storage 11 is within the generation range of the verifier (Step B4). When the read range is within the generation range of the verifier (YES in Step B5), the verifier generation unit 121 generates a verifier of the data read from the storage 11 (Step B6). When the read range is not within the generation range of the verifier (NO in Step B5), the verifier is not generated.

The storage area read unit 123 transfers the data read from the storage 11 to the command input-and-output unit 126 (Step B7). The command input-and-output unit 126 transmits the data, which is read from the storage 11 and is transferred from the storage area read unit 123, to the RAM 3 and transmits the execution result to the host CPU 2 (Step B8).

Figure 6:
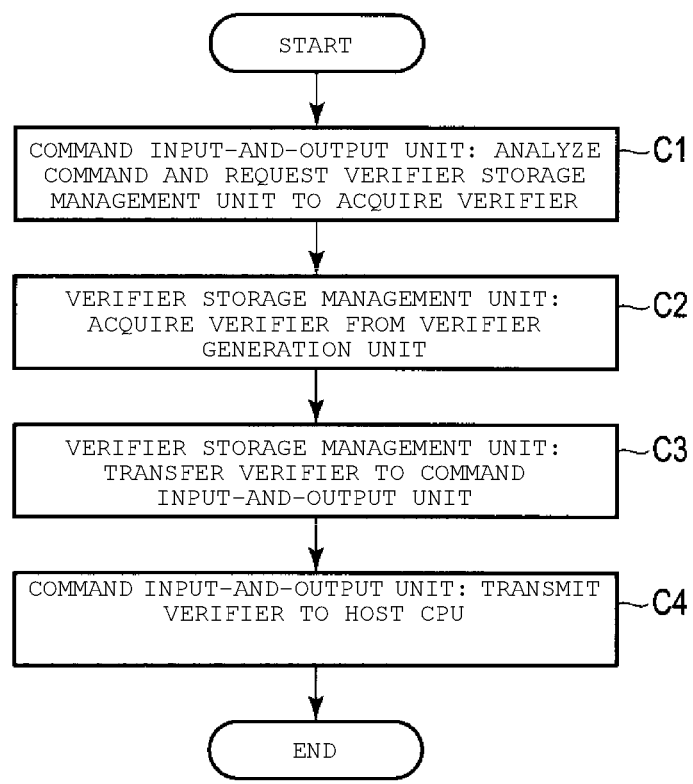
FIG. 6 is a flowchart illustrating a processing procedure when receiving a verifier acquisition command in the storage device of the first embodiment.

FIG. 6 is a flowchart illustrating a processing procedure when receiving a verifier acquisition command in the storage device 1.

For example, when the verifier acquisition command to which an identifier of a verifier generation range or a logical address of data are attached as parameters, is received, the command input-and-output unit 126 analyzes the command and requests the verifier storage management unit 125 to acquire the verifier of the data in the storage 11 designated by the parameter (Step C1). The verifier storage management unit 125 which received the request acquires the verifier from the verifier generation unit 121 (Step C2).

The verifier storage management unit 125 transfers the acquired verifier to the command input-and-output unit 126 (Step C3). The command input-and-output unit 126 transmits the verifier transferred from the verifier storage management unit 125 to the host CPU 2 (Step C4).

Figure 7:
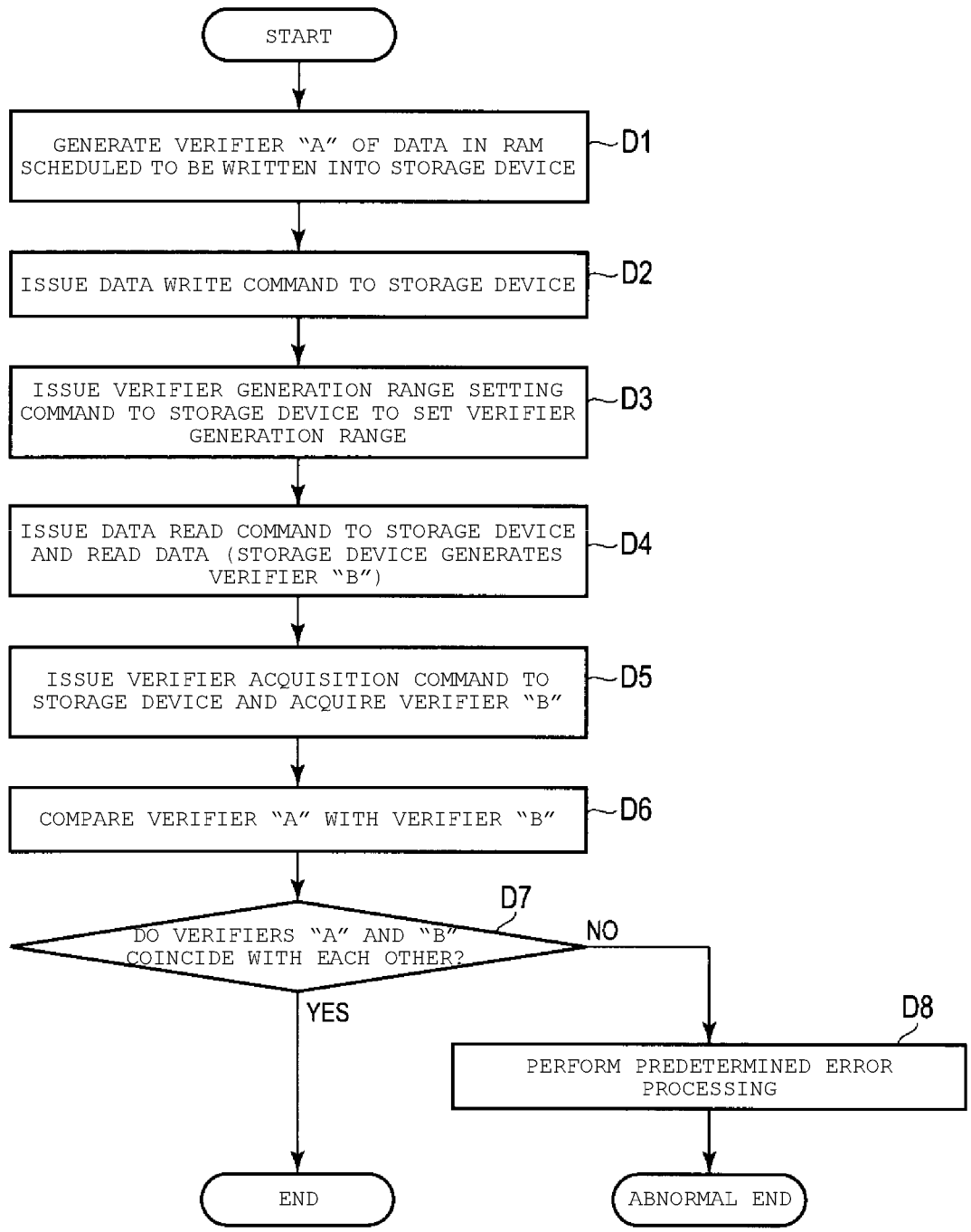
FIG. 7 is a flowchart illustrating a processing procedure in a case where a host CPU performs verification of data read from the storage device in the first embodiment.

FIG. 7 is a flowchart illustrating a processing procedure in a case where the host CPU 2 performs verification of the data read from the storage device 1.

The host CPU 2 generates a verifier of data in the RAM 3 scheduled to be written into the storage device 1 (Step D1). This verifier is referred to herein as a verifier A. The host CPU 2 issues a data write command for writing the data to the storage device 1 (Step D2).

The host CPU 2 issues a verifier generation range setting command to the storage device 1 to set a verifier generation range including an area in which the data is written (Step D3). Step D2 and Step D3 may be reversed in order.

Thereafter, when the host CPU 2 issues a data read command to the storage device 1 (Step D4) and read the data written in Step D2, a verifier of the data is generated in the storage device 1. This verifier is referred to herein as a verifier B.

When the host CPU 2 performs verification of the data in the RAM 3 read from the storage device 1, the host CPU 2 issues a verifier acquisition command to the storage device 1 to acquire the verifier B (Step D5). The host CPU 2 compares the verifier A generated in Step D1 with the verifier B acquired in Step D5 (Step D6). When the verifiers A and B coincide with each other (YES in Step D7), the host CPU 2 determines that there is no tampering of data and ends the verification. When the verifiers A and B do not coincide with each other (NO in Step D7), the host CPU 2 determines that tampering of the data has occurred, performs predetermined error processing (Step D8), and abnormally ends the processing.

Figure 8:
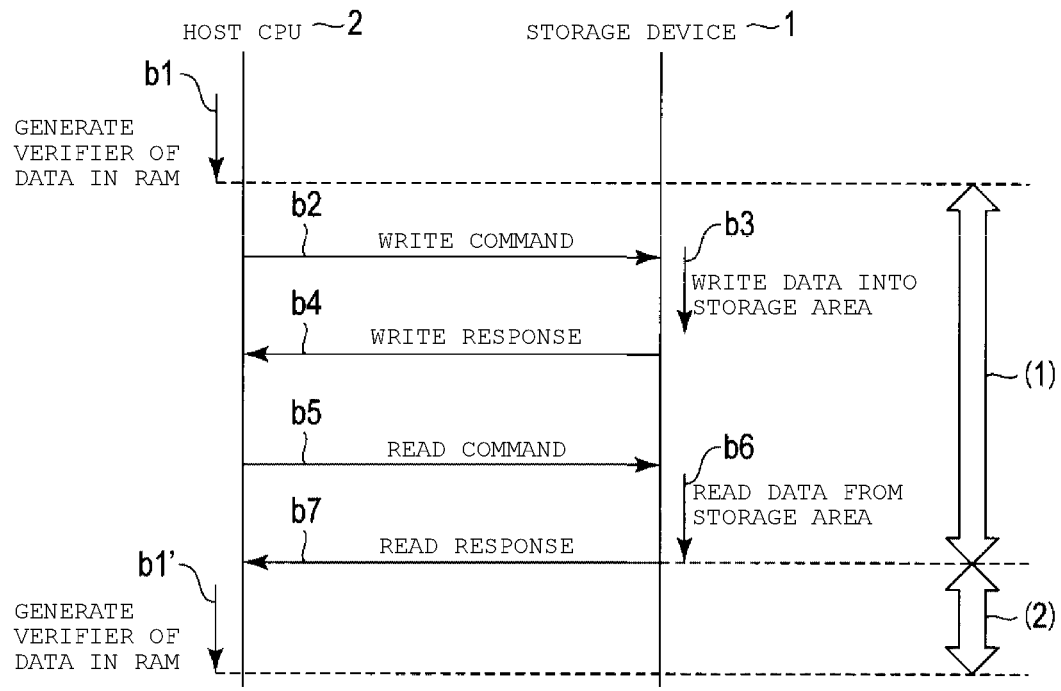
FIG. 8 is a diagram illustrating a sequence in which the host CPU performs the verification of the data read from the storage device in the first embodiment.

FIG. 8 is a diagram illustrating a sequence in which the host CPU 2 performs verification of the data read from the storage device 1. The verifier A is generated from data in the RAM 3 before being written into the storage device 1 (b1). The host CPU 2 writes the data to the storage device 1 (b2 to b4) and reads the data from the storage device 1 (b5 to b7). Then, the host CPU 2 compares the verifier A with the verifier B which is generated when reading the data from the storage device 1 and acquired from the storage device 1, thereby capable of performing verification of the data written in the storage device 1. When the verifiers do not coincide with each other, it is understood that the data is tampered with in a section (1) from the point in time when the verifier is generated from the data in the RAM 3 before being written into the storage device 1 to the point in time when the data is read from the storage device 1.

In the description described above, an example in which the verifier A is generated from the data in the RAM 3 before being written into the storage device 1 is described, but is not limited thereto. The verifier A may be generated from the data in the RAM 3 at any timing.

For example, when the host CPU 2 generates the verifier A from the data in the RAM 3 read from the storage device 1 (b1'), the host CPU 2 can perform verification of the data in the RAM 3 read from the storage device 1. When the verifier B, which is generated when reading the data from the storage device 1 and is acquired from the storage device 1, coincides with the verifier generated from the data in the RAM 3 before being written into the storage device 1 but does not coincide with the verifier generated from the data in the RAM 3 read from the storage device 1, the host CPU 2 understands that the data is tampered with in a section (2) from the point in time when the data is read from the storage device 1 to the point in time when the verifier is generated from the data in the RAM 3 read from the storage device 1.

Thus, in the storage device 1 of the first embodiment, which generates a verifier when reading data of the verifier generation range, reduction in the load on the host CPU 2 relating to verification of data is achieved.

In the first embodiment, description is made by using an example in which the verifier generation range setting command and the data read command are implemented as individual commands is described, but the commands may be implemented as one command. In the first embodiment, description is made by using an example in which data is read from the storage 11 via the verifier generation management unit 122, but the data to be read from the storage 11 does not necessarily have to go through the verifier generation management unit 122, and the storage area read unit 123 may directly read data from the storage 11. Furthermore, in the first embodiment, description is made by using an example in which the command input-and-output unit 126 analyzes the command from the host CPU 2 and requests processing to the storage area read unit 123, the verifier generation range setting unit 124, and the verifier storage management unit 125, but the storage area read unit 123, the verifier generation range setting unit 124, and the verifier storage management unit 125 may receive the command directly from the host CPU 2.

Second Embodiment

Next, a second embodiment will be described. The same reference numerals are used for the same elements as those in the first embodiment, and redundant descriptions thereof will be omitted.

Figure 9:
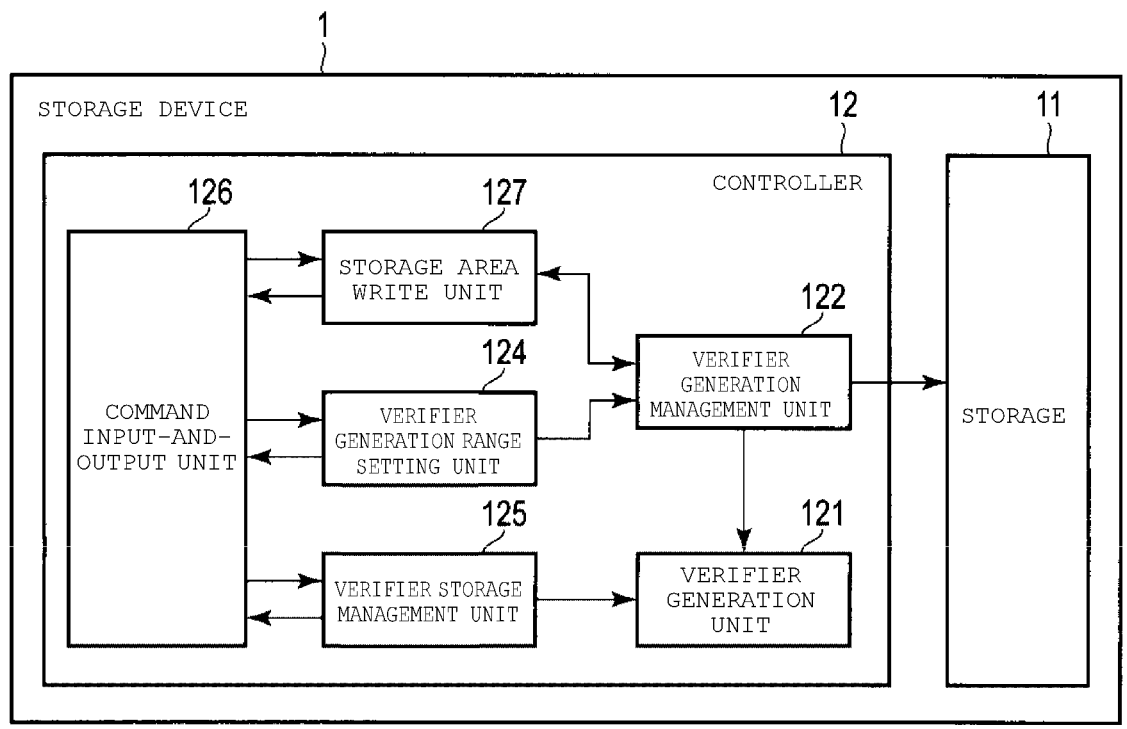
FIG. 9 is a block diagram illustrating a functional configuration of a storage device of a second embodiment.

FIG. 9 is a block diagram illustrating a functional configuration of the storage device 1 of the second embodiment.

As illustrated in FIG. 9, in the second embodiment, the controller 12 includes a storage area write unit 127. When a data write command is issued from the host CPU 2, the storage area write unit 127 writes data into an area of the storage 11 designated by the command. In the storage device 1 of the second embodiment, a verifier is generated when writing data to provide an integrity verification method of data written in the storage device 1, more specifically, the storage 11. By generating the verifier of the written data by the storage device 1, the host CPU 2 can verify whether intended data is written.

The storage area read unit 123 described in the first embodiment is not illustrated in FIG. 9. It is omitted because the storage area read unit 123 is not involved in verification of data, and data reading is not described in this embodiment.

Figure 10:
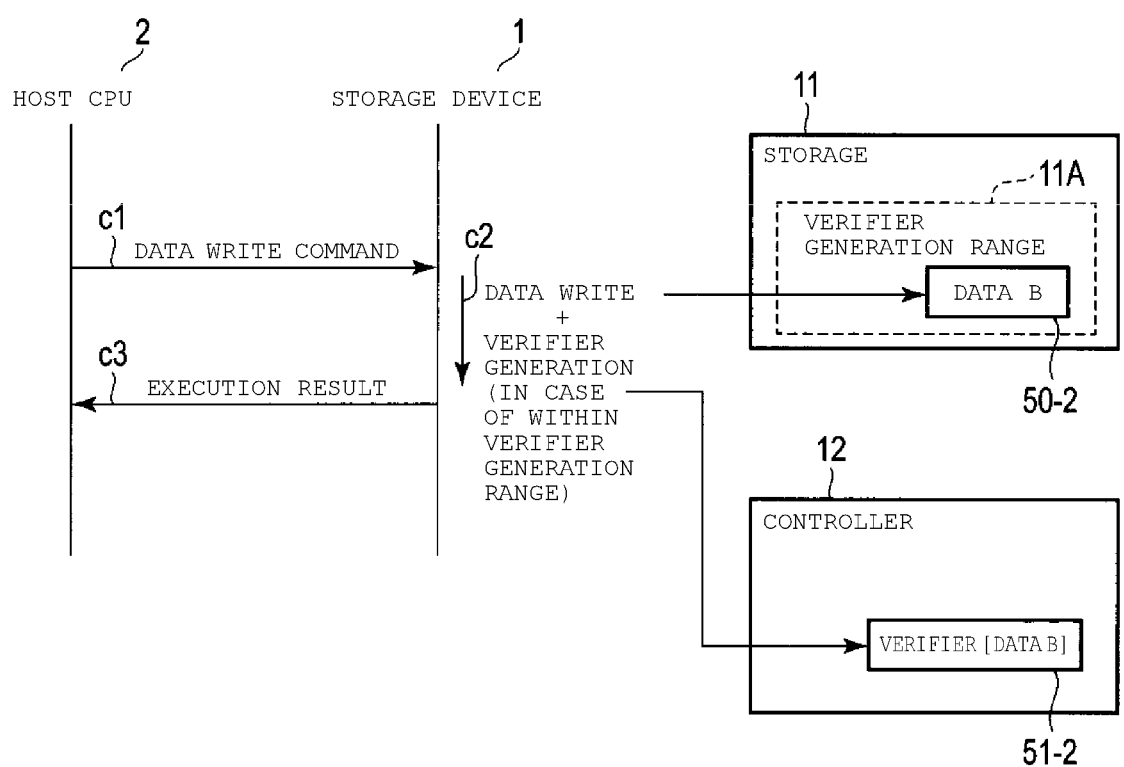
FIG. 10 is a diagram for explaining a flow of processing when receiving a data write command in the storage device of the second embodiment.

With reference to FIG. 10, a flow of processing of the storage device 1 in a case where a data write command is issued by the host CPU 2 will be described.

When a data write command is issued to write data (data B 50-2) from the host CPU 2 (c1), the storage device 1 which received the data write command determines whether or not the area is within the verifier generation range 11A, in addition to writing the data to the storage 11, and when it is determined that the area is within the verifier generation range 11A, the storage device 1 generates a verifier (verifier [data B] 51-2) of the data (c2). This verifier is stored, for example, in an area allocated in a memory of the controller 12 by the verifier storage management unit 125, together with an identifier of the verifier generation range 11A and a logical address indicating a logical storage area of the data. The storage device 1 transmits the execution result to the host CPU 2 (c3).

Figure 11:
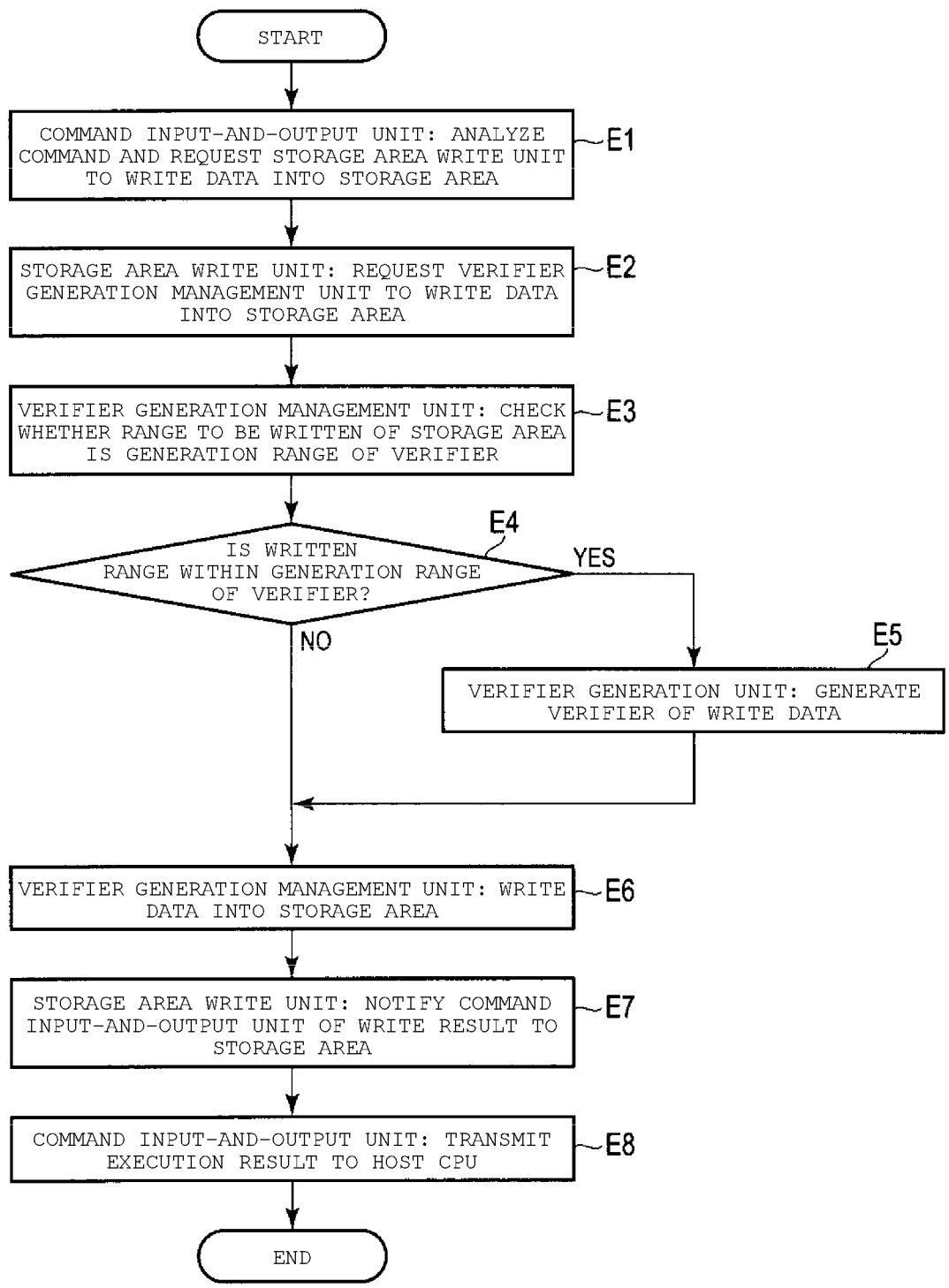
FIG. 11 is a flowchart illustrating a processing procedure when receiving the data write command in the storage device of the second embodiment.

FIG. 11 is a flowchart illustrating a processing procedure when receiving a data write command in the storage device 1.

When the data write command is received, the command input-and-output unit 126 analyzes the command and requests the storage area write unit 127 to write data into a designated area in the storage 11 (Step E1). The storage area write unit 127 which received the request requests the verifier generation management unit 122 to write data into the designated area in the storage 11 (Step E2).

The verifier generation management unit 122 checks whether the range to be written of the storage 11 is the generation range of the verifier (Step E3). When the range is within the generation range of the verifier (YES in Step E4), the verifier generation unit 121 generates a verifier of the write data (Step E5). When the range is not within the generation range of the verifier (NO in Step E4), no verifier is generated. The verifier generation management unit 122 writes the data into the storage 11 (Step E6).

The storage area write unit 127 notifies the command input-and-output unit 126 of the write result to the storage 11 (Step E7). The command input-and-output unit 126 transmits the execution result notified from the storage area write unit 127 to the host CPU 2 (Step E8).

Figure 12:
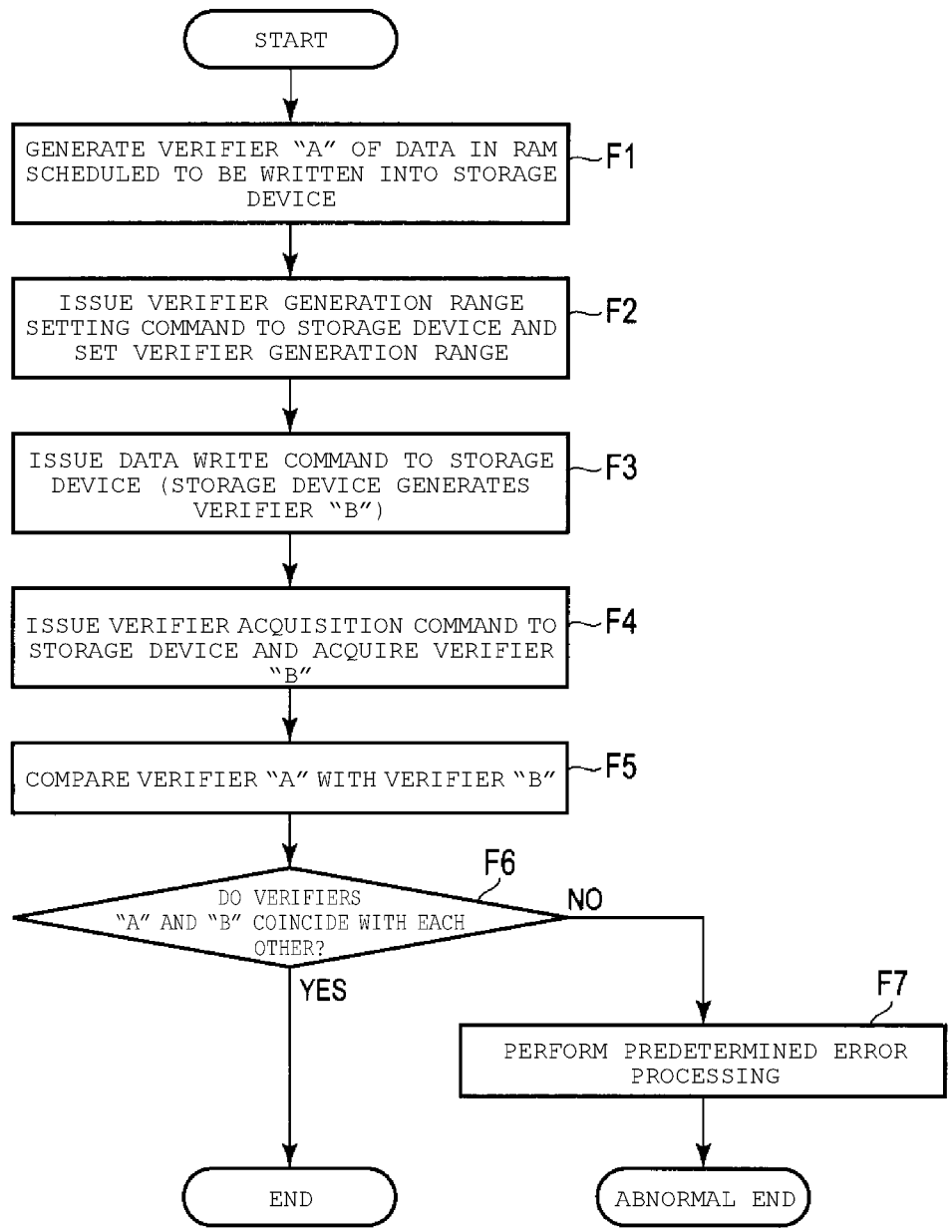
FIG. 12 is a flowchart illustrating a processing procedure in a case where the host CPU performs verification of data written in the storage device of the second embodiment.

FIG. 12 is a flowchart illustrating a processing procedure in a case where the host CPU 2 performs verification of the data written in the storage device 1.

The host CPU 2 generates a verifier of data in the RAM 3 scheduled to be written into the storage device 1 (Step F1). This verifier is referred to as a verifier A. The host CPU 2 issues a verifier generation range setting command to the storage device 1 and sets a verifier generation range including an area into which the data is scheduled to be written (Step F2). Then, the host CPU 2 issues a data write command for writing the data to the storage device 1 (Step F3). In the second embodiment, at this timing, a verifier of the data is generated in the storage device 1. This verifier is referred to as a verifier B.

When verification of the data written in the storage device 1 is performed, the host CPU 2 issues a verifier acquisition command to the storage device 1 and acquires the verifier B (Step F4). The host CPU 2 compares the verifier A generated in Step F1 with the verifier B acquired in Step F4 (Step F5). When the verifiers coincide with each other (YES in Step F6), the host CPU 2 determines that there is no tampering of the data and ends the verification. On the other hand, in a case where the verifiers do not coincide with each other (NO in Step F6), the host CPU 2 determines that tampering of the data has occurred, performs predetermined error processing (Step F7), and abnormally ends the processing.

FIG. 13 is a diagram illustrating a sequence in which the host CPU 2 performs verification of data written in the storage device 1. The verifier A is generated from the data in the RAM 3 before being written into the storage device 1 (d1). The host CPU 2 acquires the verifier B generated by the storage device 1 when the data is written into the storage device 1 (d2 to d4) and compares the verifier A with the verifier B, thereby capable of performing verification of the data written in the storage device 1. When the verifiers A and B do not coincide with each other, it is understood that the data is tampered with in a section (3) from the point in time when the verifier is generated from the data in the RAM 3 before being written into the storage device 1 to the point in time when the data is written into the storage device 1.

In the description described above, an example in which the verifier A is generated from the data in the RAM 3 before being written into the storage device 1 is described, but is not limited thereto. For example, the verifier A may be generated from data in the RAM 3 read from the storage device 1 (d5 to d7) (d1').

In this case, the host CPU 2 can perform verification of the data read into the RAM 3. When the verifier A does not coincide with the verifier B acquired from the storage device 1 (generated when reading from the storage device 1), the host CPU 2 understands that the data is tampered in a section (4) from the point in time when the data is written into the storage device 1 to the point in time when a verifier is generated from the data in the RAM 3 read from the storage device 1 or during the data transfer from the storage device 1 to the RAM 3.

As such, in the storage device 1 of the second embodiment that generates a verifier when writing data into the verifier generation range, reduction of the load on the host CPU 2 relating to data tampering detection is achieved.

In the second embodiment, description is made by using an example in which data is written into the storage 11 via the verifier generation management unit 122, but the data to be written into the storage 11 does not necessarily have to go through the verifier generation management unit 122, and the storage area write unit 127 may directly write data into the storage 11.

Third Embodiment

Next, a third embodiment will be described. The same reference numerals are used for the same elements as those in the first and second embodiments, and redundant descriptions thereof will be omitted.

FIG. 14 is a diagram illustrating a configuration example and a connection example of the storage device 1 of the third embodiment.

As illustrated in FIG. 14, the storage device 1 of the third embodiment includes a security information storage area 13 which is, for example, a RAM, a register, or the like. The security information storage area 13 is an area which stores a data verifier and is provided separately from the storage 11. In the third embodiment, a verifier is generated both when writing data and when reading data, and the verifier generated when writing the data is stored in the security information storage area 13. Similar to the first embodiment, the verifier generated when reading the data is stored, for example, in an area allocated in a memory of the controller 12 by the verifier storage management unit 125, together with an identifier of the verifier generation range and a logical address indicating a logical storage area of the data.

Figure 15:
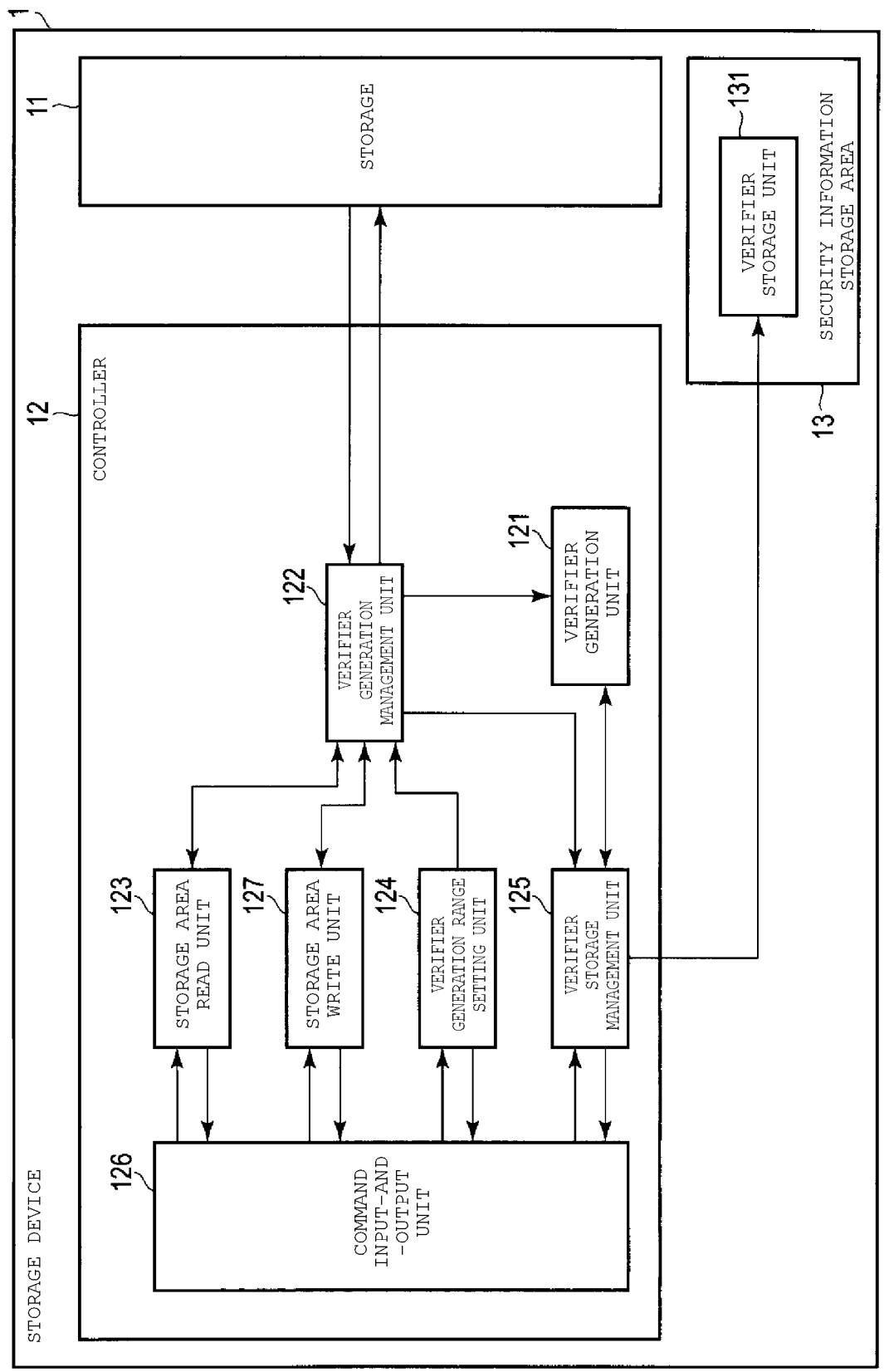
FIG. 15 is a block diagram illustrating a functional configuration of the storage device of the third embodiment.

FIG. 15 is a block diagram illustrating a functional configuration of the storage device 1 of the third embodiment.

As illustrated in FIG. 15, the security information storage area 13 includes a verifier storage unit 131 for storing a verifier generated by the verifier generation unit 121 of the controller 12. More specifically, the verifier storage unit 131 for storing the verifier in the security information storage area 13 is provided in association with the security information storage area 13.

Figure 16:
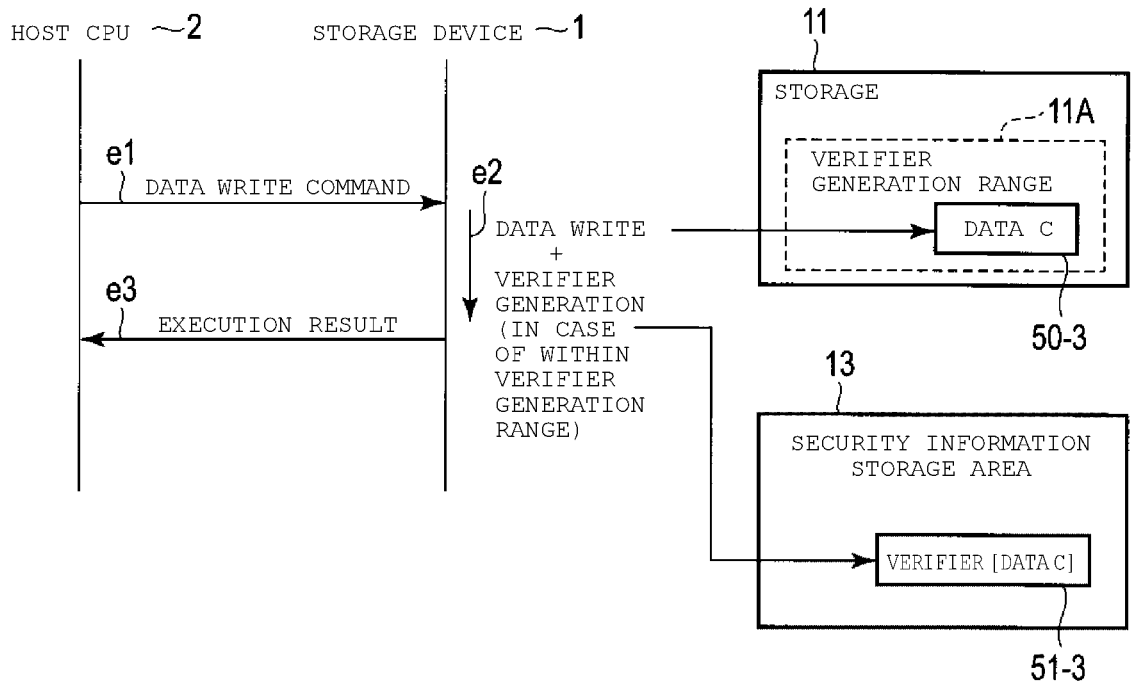
FIG. 16 is a diagram for explaining a flow of processing when receiving a data write command in the storage device of the third embodiment.

First, with reference to FIG. 16, a flow of processing of the storage device 1 in the third embodiment in a case where a data write command is issued by the host CPU 2 will be described.

When a data write command is issued to write data (data C 50-3) from the host CPU 2 (e1), the storage device 1 which received the data write command determines whether or not the area is within the verifier generation range 11A, in addition to writing the data into the storage 11, and when it is determined that the area is within the verifier generation range 11A, the storage device 1 generates a verifier (verifier [data C] 51-3) of the data and stores the generated verifier in the security information storage area 13 (e2). The storage device 1 transmits the execution result to the host CPU 2 (e3).

Figure 17:
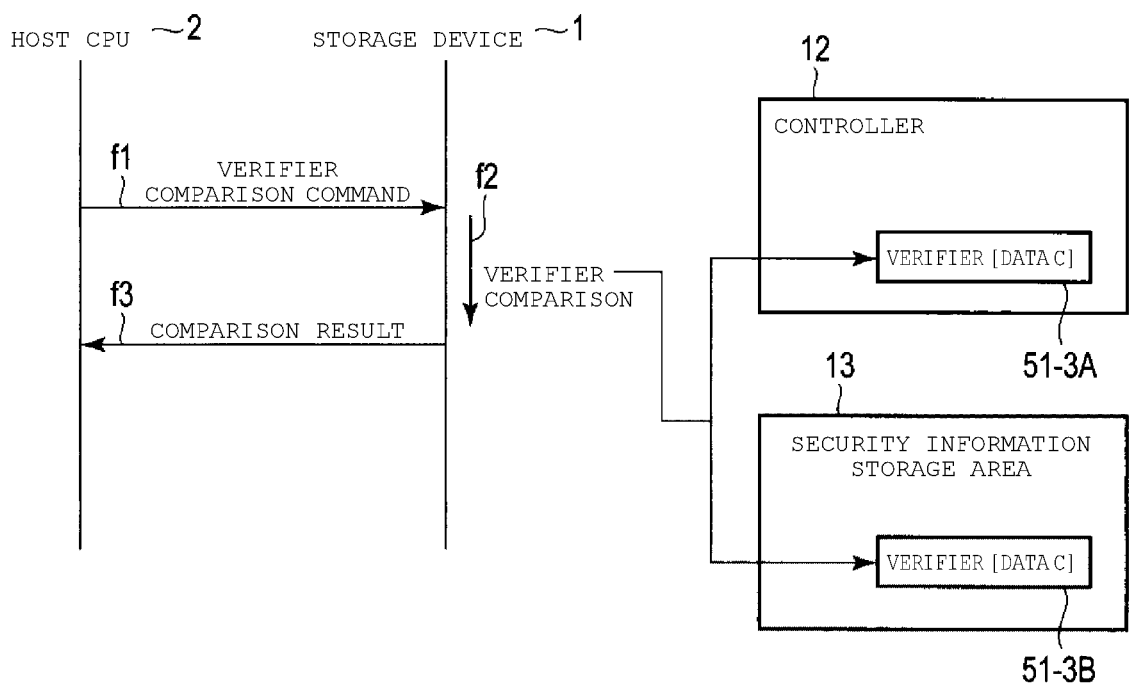
FIG. 17 is a diagram for explaining a flow of processing when receiving a verifier comparison command in the storage device of the third embodiment.

In the third embodiment, the storage device 1 further executes processing of a verifier comparison command. With reference to FIG. 17, a flow of processing of the storage device 1 in a case where the verifier comparison command is issued by the host CPU 2 will be described.

When the verifier comparison command for checking the verifier (verifier [data C] 51-3) of the data (data C 50-3) is issued from the host CPU 2 (f1), the storage device 1 which received the verifier comparison command compares a verifier generated when the data is read from the storage 11 and stored in the controller 12 with the verifier generated when the data is written in the storage 11 and stored in the security information storage area 13 (f2), and transmits the comparison result to the host CPU 2 (f3). Designation of a check target by the verifier comparison command is performed, for example, by attaching an identifier of a verifier generation range or a logical address of the data as parameters to the command.

The verifier stored in the controller 12 is a verifier (verifier [data C] 51-3A) generated from the most recently read data. If tampering of data has not occurred, the value of the verifier in the controller 12 is equal to a value of the verifier generated when writing the data and stored in the security information storage area 13.

Figure 18:
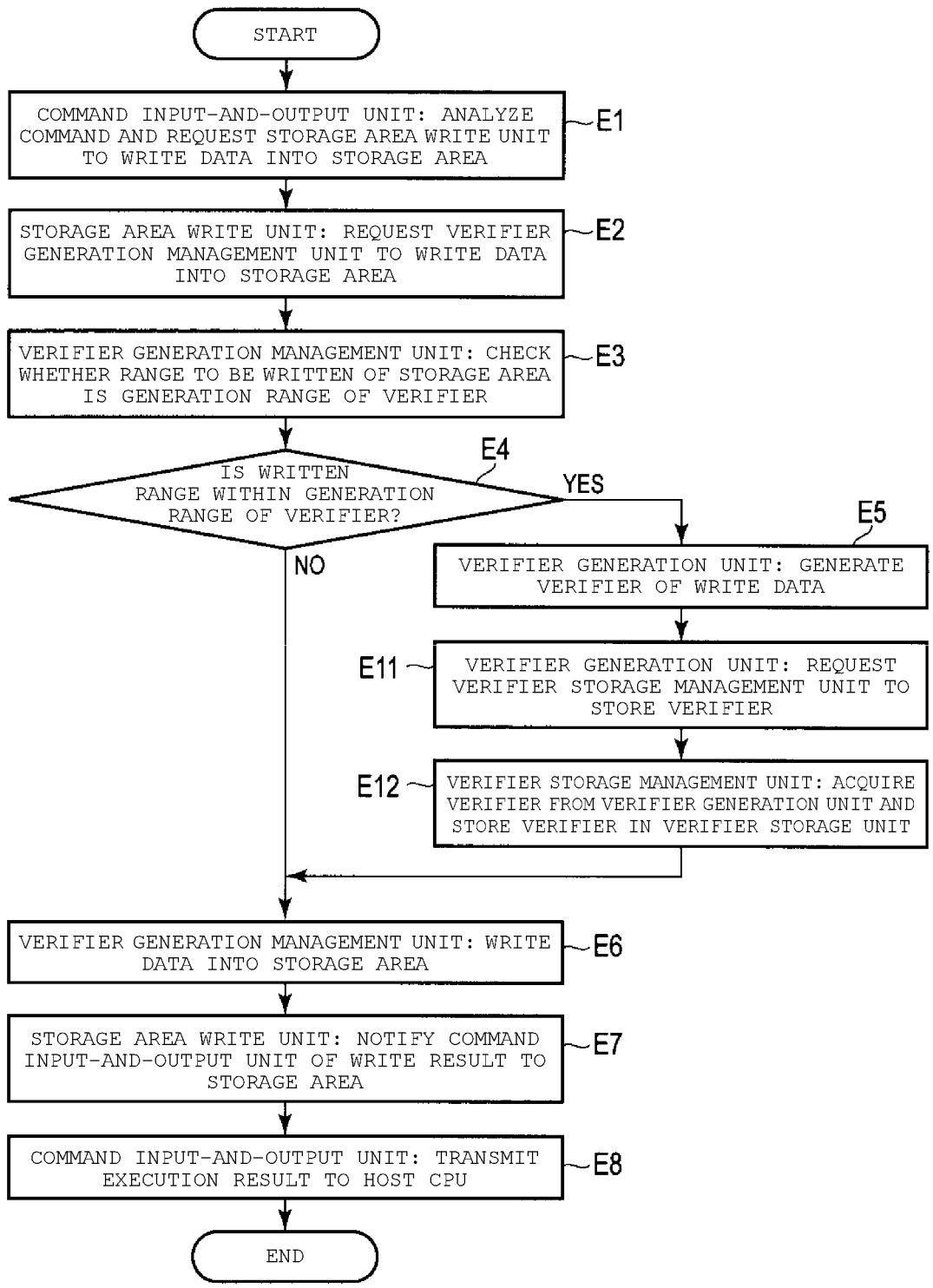
FIG. 18 is a flowchart illustrating a processing procedure when receiving the data write command in the storage device of the third embodiment.

FIG. 18 is a flowchart illustrating a processing procedure when receiving a data write command in the storage device 1.

Steps E1 to E8 in FIG. 18 correspond to Steps E1 to E8 in FIG. 11 illustrated in the second embodiment. In the third embodiment, furthermore, processing of Steps E11 and E12 is executed between Steps E5 and E6.

When the verifier of the data is generated in Step E5, the verifier generation unit 121 requests the verifier storage management unit 125 to store the verifier (Step E11). The verifier storage management unit 125 which received the request acquires the verifier from the verifier generation unit 121 and stores the verifier in the verifier storage unit 131, that is, in the security information storage area 13 (step E12).

Figure 19:
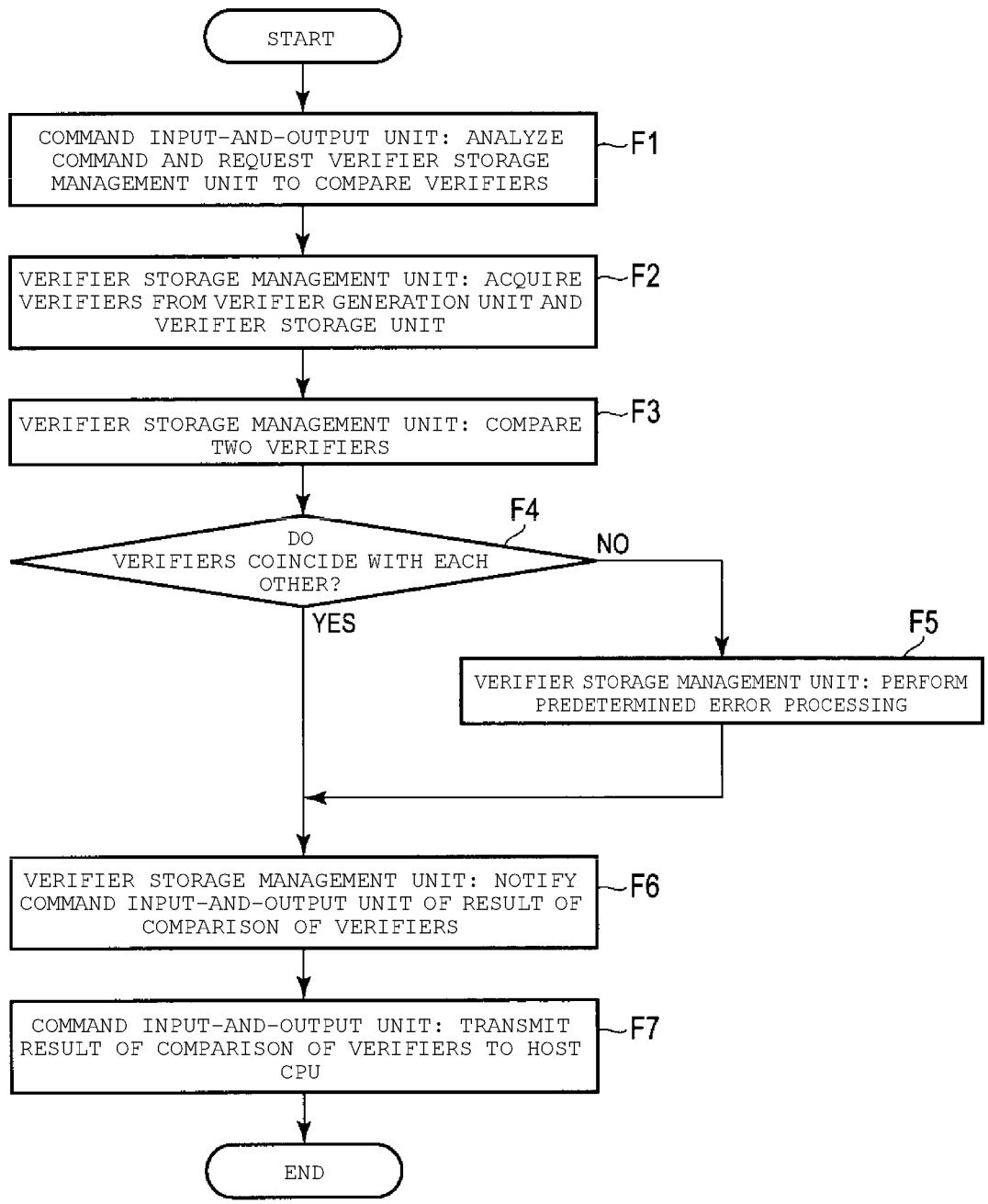
FIG. 19 is a flowchart illustrating a processing procedure when receiving the verifier comparison command in the storage device of the third embodiment.

FIG. 19 is a flowchart illustrating a processing procedure when receiving the verifier comparison command in the storage device 1.

When the verifier comparison command is received, the command input-and-output unit 126 analyzes the command and requests the verifier storage management unit 125 to check the verifiers, more specifically, to compare the verifiers (Step F1). The verifier storage management unit 125 which received the request acquires the verifier from the verifier generation unit 121 which is generated when the data is read and the verifier from the verifier storage unit 131 which is generated when the data is written (Step F2). The verifier storage management unit 125 then compares the two acquired verifiers (Step F3).

When the verifiers do not coincide with each other (NO in Step F4), the verifier storage management unit 125 performs predetermined error processing (Step F5). As the predetermined error processing, the verifier storage management unit 125 may perform processing, for example, notifying the host CPU 2 of a verifier non-coincidence, and locking the storage device 1 to be unreadable and unwritable. When the verifiers coincide with each other (YES in Step F4), no special processing is performed. The verifier storage management unit 125 notifies the command input-and-output unit 126 of the result of comparison of the verifiers (Step F6). The command input-and-output unit 126 transmits, to the host CPU 2, the result of comparison of the verifiers notified from the verifier storage management unit 125 (Step F7).

Figure 20:
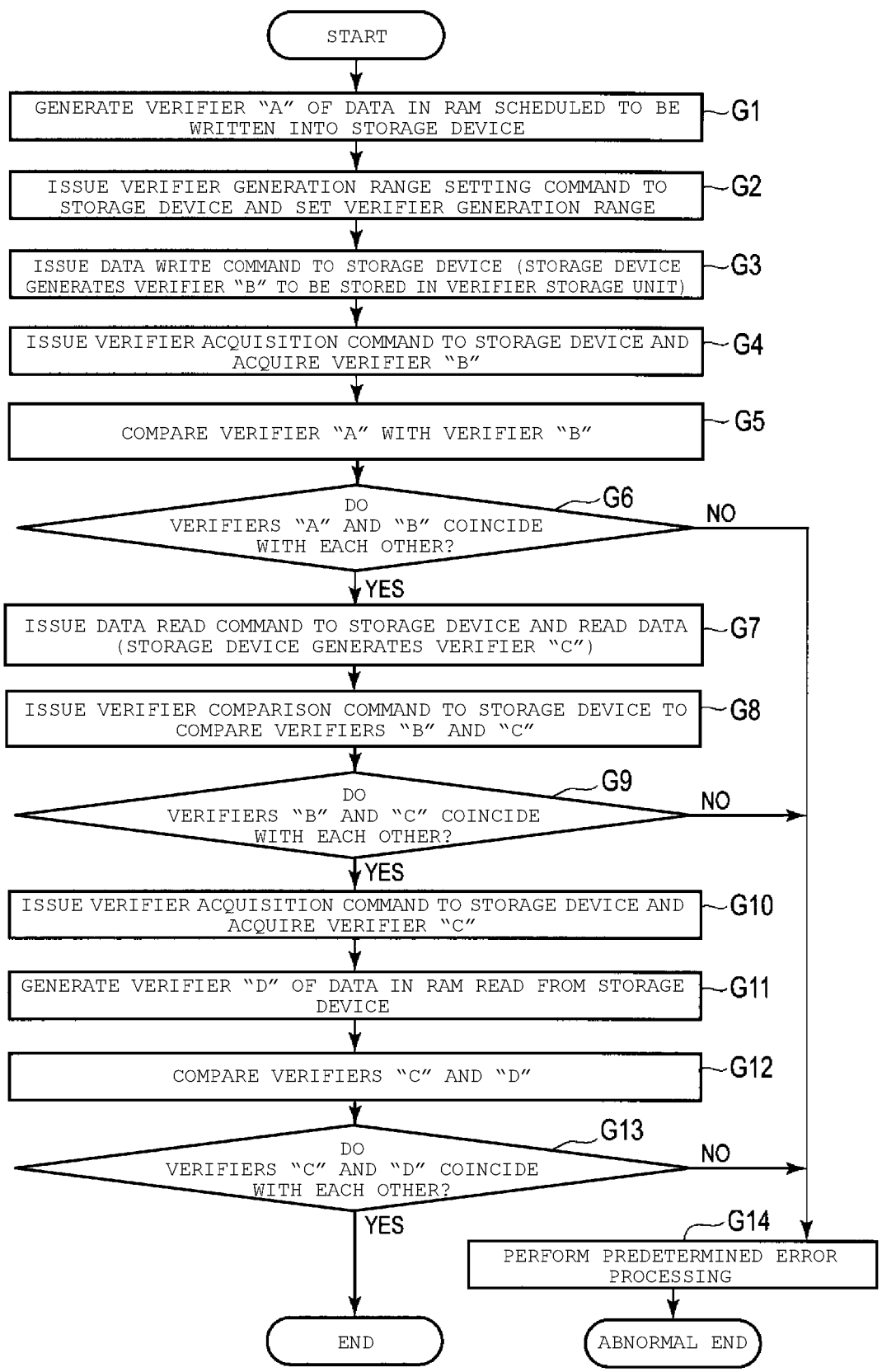
FIG. 20 is a flowchart illustrating a processing procedure in a case where the host CPU performs verification of data written in the storage device of the third embodiment.

On the other hand, FIG. 20 is a flowchart illustrating a processing procedure in a case where the host CPU 2 performs verification of data written in the storage device 1 or data read from the storage device 1.

The host CPU 2 generates a verifier of data in the RAM 3 scheduled to be written into the storage device 1 (Step G1). This verifier is referred to as a verifier A. The host CPU 2 issues a verifier generation range setting command to the storage device 1 and sets a verifier generation range including an area into which the data is scheduled to be written (G2). Then, the host CPU 2 issues a data write command for writing the data to the storage device 1 (Step G3). At this time, a verifier of the data is generated in the storage device 1. This verifier is referred to as a verifier B. The verifier B is stored in the verifier storage unit 131.

When verification of the data written in the storage device 1 is performed, the host CPU 2 issues a verifier acquisition command to the storage device 1 and acquires the verifier B (step G4). The host CPU 2 compares the verifier A generated in step G1 with the verifier B acquired in step G4 (step G5). When the verifiers coincide with each other (YES in Step G6), the host CPU 2 determines that there is no tampering of the data. When the verifiers do not coincide with each other (NO in Step G6), the host CPU 2 determines that tampering of the data has occurred, performs predetermined error processing (Step G14), and abnormally ends the processing.

The host CPU 2 issues a data read command to the storage device 1 and reads the data written in the storage device 1 (step G7). At this time, a verifier of the data is generated in the storage device 1. This verifier is referred to as a verifier C. When verification of the data read in the storage device 1 at this time is performed, the host CPU 2 issues a verifier comparison command to the storage device 1 to compare the verifiers B and C (Step G8). More specifically, the comparison result is acquired from the storage device 1. When the verifiers coincide with each other (YES in Step G9), the host CPU 2 determines that there is no tampering of data. On the other hand, when the verifiers do not coincide with each other (NO in Step G9), the host CPU 2 determines that tampering of the data has occurred, performs predetermined error processing (Step G14), and abnormally ends the processing.

In a case where verification of data in the RAM 3 read from the storage device 1 is performed, the host CPU 2 issues a verifier acquisition command to the storage device 1, and acquires the verifier C (step G10). Along with this, the host CPU 2 generates a verifier of the data in the RAM 3 read from the storage device 1 (step G11). This verifier is referred to as a verifier D. The host CPU 2 compares the verifier C acquired in step G10 with the verifier D generated in step G11 (step G12). When the verifiers coincide with each other (YES in Step G13), the host CPU 2 determines that there is no tampering of the data and ends the verification. On the other hand, when the verifiers do not coincide with each other (NO in Step G13), the host CPU 2 determines that tampering of the data has occurred, performs predetermined error processing (Step D8), and abnormally ends the processing.

Figure 21:
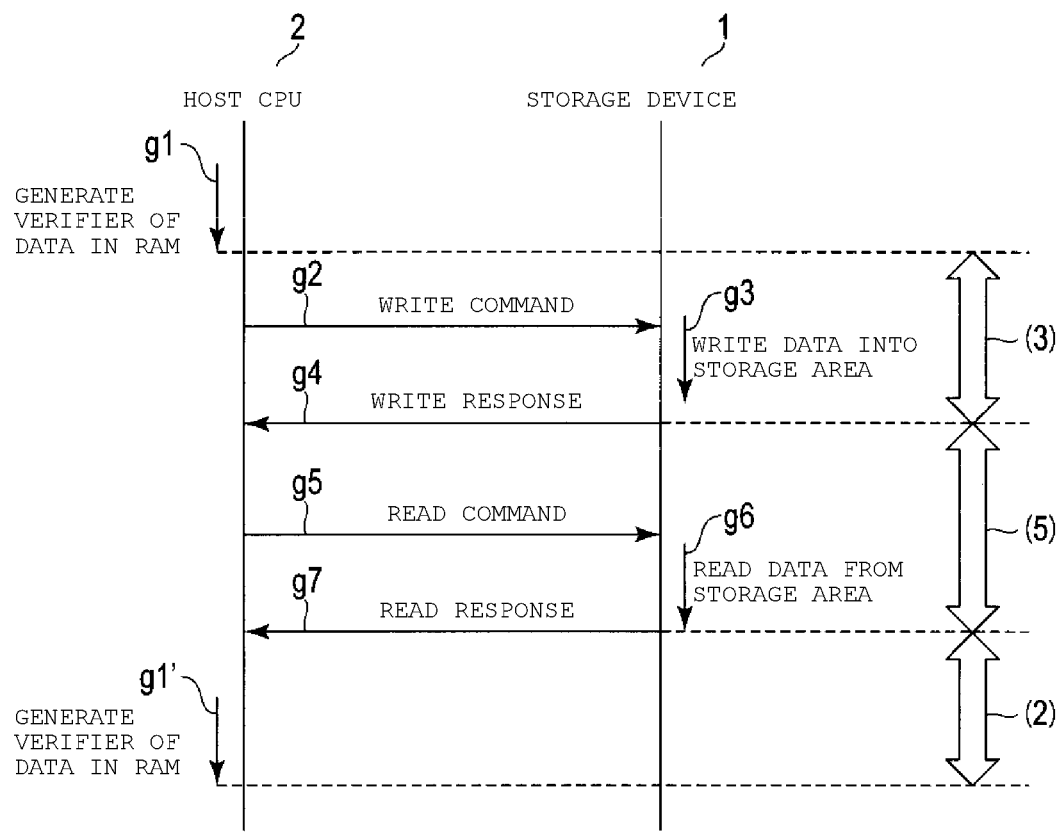
FIG. 21 is a diagram illustrating a sequence in which the host CPU performs verification of data written in the storage device of the third embodiment.

FIG. 21 is a diagram illustrating a sequence in which the host CPU 2 performs verification of data written in the storage device 1 or data read from the storage device 1.

The host CPU 2 compares a verifier (g1) generated from data in the RAM 3 before being written into the storage device 1 with a verifier which is generated in the storage device 1 during the writing of the data (g2 to g4) and acquired after the data has been written into the storage device 1, thereby capable of performing verification of the data written in the storage device 1. When the verifiers do not coincide with each other, it is understood that the data is tampered with in a section (3) from the point in time when the verifier is generated from the data in the RAM 3 before being written into the storage device 1 to the point in time when the data is written into the storage device 1.

When reading the written data (g5 to g7), the host CPU 2 issues a verifier comparison command to the storage device 1 to compare the verifier generated when writing data and stored in the verifier storage unit 131 of the security information storage area 13 and a verifier generated when reading the data and stored in the verifier storage management unit 125 of the controller 12, thereby capable of detecting tampering of the read data. When the verifiers do not coincide with each other, it is understood that the data is tampered with in a section (5) from the point in time when the data is written into the storage device 1 to the point in time when the data is read from the storage device 1.

Furthermore, after the data is read, the host CPU 2 compares a verifier (g1') generated from the data in the RAM 3 with the verifier acquired from the storage device 1, thereby capable of performing verification of the data in the RAM 3. When the verifiers do not coincide with each other, it is understood that the data is tampered with in the section (2) from the point in time when the data is read from the storage device 1 to the point in time when the verifier is generated from the data in the RAM 3.

Thus, in the storage device 1 of the third embodiment, which executes the verifier comparison on the data within the verifier generation range, reduction in the load on the host CPU 2 relating to verification of data is achieved.

In the third embodiment, although description is made by using an example in which the host CPU 2 generates verifiers of data in the RAM 3 before and after writing and reading, and performs verification, it is not always necessary to generate the verifier of data in the RAM 3 to perform the verification, and verification may be performed by generating a verifier from the same data saved in other areas, for example. In the third embodiment, although description is made by using an example in which the verifier comparison is performed two times, it is not always necessary to perform all the comparisons, and any one of the comparisons may be performed.

Figure 22:
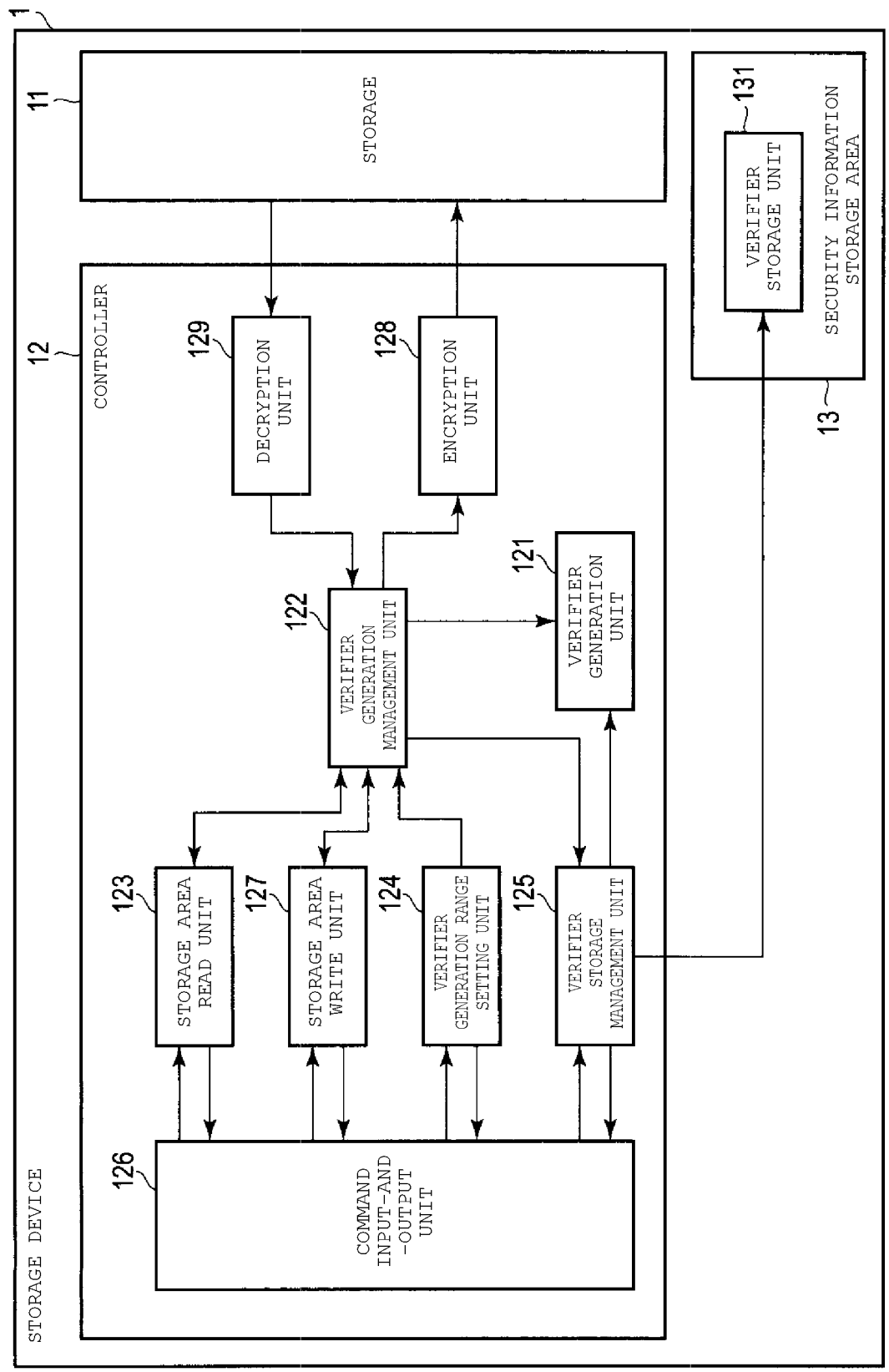
FIG. 22 is a block diagram illustrating a functional configuration of a storage device of a modification example of the third embodiment.

Here, a modification example of the third embodiment will be described. FIG. 22 is a block diagram illustrating a functional configuration of the storage device 1 of the modification example.

As illustrated in FIG. 22, in the modification example, the controller 12 includes an encryption unit 128 and a decryption unit 129. The encryption unit 128 encrypts data to be written into the storage 11. The decryption unit 129 decrypts the encrypted data which is read from the storage 11. Data encryption and decryption may be performed on only data in the verifier generation range, or may be performed on all data regardless of the verifier generation range.

In this modification example, in addition to verification of data on the storage 11, a method of concealing data is provided. The encryption unit 128 and the decryption unit 129 may also be provided in the storage device 1 of the first or second embodiment.

Fourth Embodiment

Next, a fourth embodiment will be described. The same reference numerals are used for the same elements as those in the first to third embodiments, and redundant descriptions thereof will be omitted.

Figure 23:
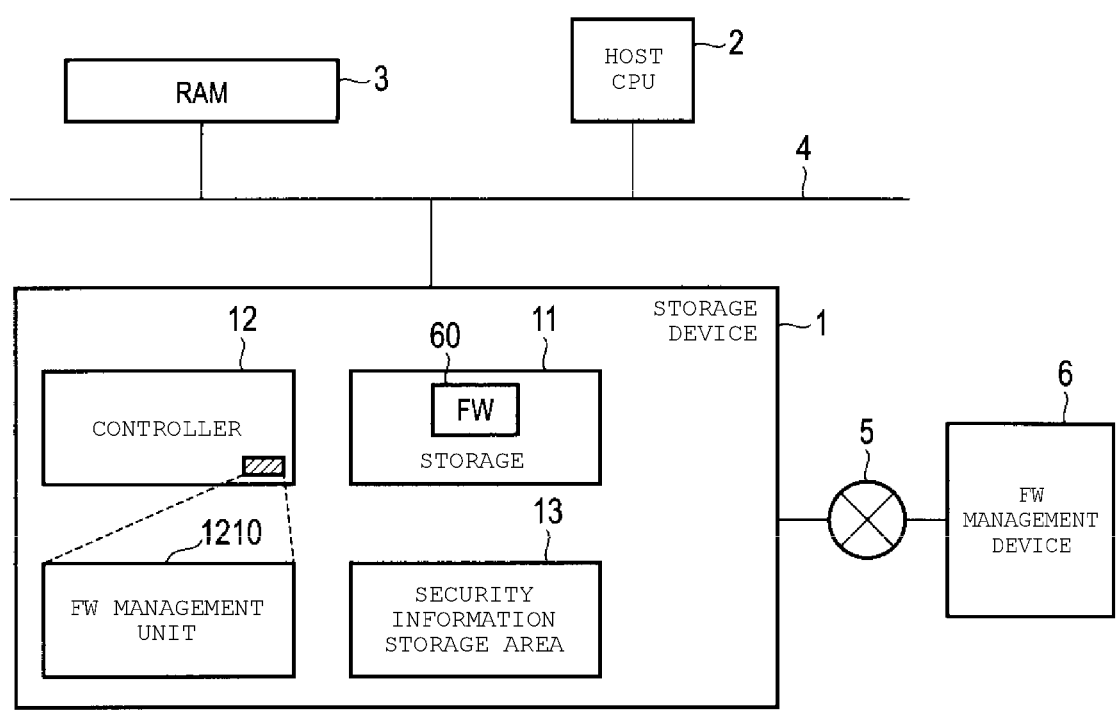
FIG. 23 is a diagram illustrating a configuration example and a connection example of a storage device of a fourth embodiment.

FIG. 23 is a diagram illustrating a configuration example and a connection example of the storage device 1 of the fourth embodiment.

As illustrated in FIG. 23, the storage device 1 of the fourth embodiment is connected to a firmware (FW) management device 6 which is a server or the like via a network 5. That is, the storage device 1 of the fourth embodiment has a function of communicating with an external device.

The host CPU 2 loads a program (e.g., FW 60) from the storage device 1 onto the RAM 3 and executes the program. If the host CPU 2 is deprived of control by a malicious FW, for example, the data in the storage device 1 might be tampered with, or the host CPU 2 suffers damage such as unintended operation performed by the host CPU 2. The storage device 1 of the fourth embodiment provides a method of verification of FW by performing communication for verification of the FW with the FW management device 6. In order to detect tampering of the FW, the storage device 1 of the fourth embodiment includes an FW management unit 1210. As illustrated in FIG. 23, the FW management unit 1210 may be a part of the controller 12 or may be implemented as one or a plurality of SoCs or one or a plurality of ASICs different from the controller 12. Also, in the succeeding figures, although the FW management unit 1210 is illustrated as a part of the controller 12, as described above, it may be implemented as one or a plurality of SoCs or one or a plurality of ASICs different from the controller 12. For example, the FW management unit 1210 may be implemented by executing a program stored in a memory incorporated in the controller 12 by a processor incorporated in the controller 12, by executing a program stored in a memory incorporated in an SoC different from the controller 12 by a processor incorporated in the SoC, or by executing a program stored in a memory incorporated in an ASIC different from the controller 12 by a processor incorporated in the ASIC, or may be implemented as a dedicated integrated circuit. That is, the FW management unit 1210 can be implemented by software or hardware. Also, a part of the FW management unit 1210 may be implemented by software, and the remaining parts of the FW management unit 1210 may be implemented by hardware.

Figure 24:
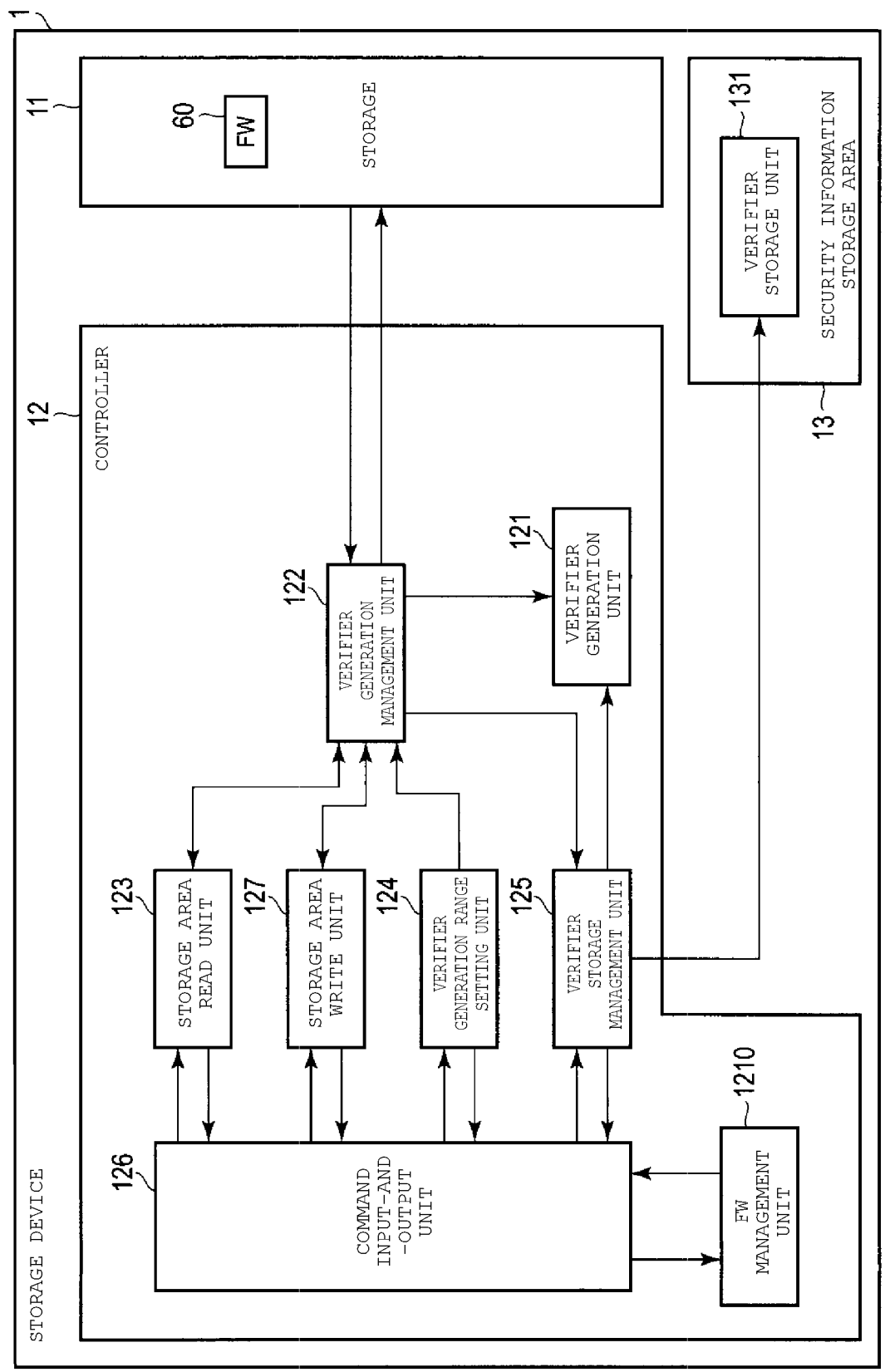
FIG. 24 is a block diagram illustrating a functional configuration of the storage device of the fourth embodiment.

FIG. 24 is a block diagram illustrating a functional configuration of the storage device 1 of the fourth embodiment.

Figure 25:
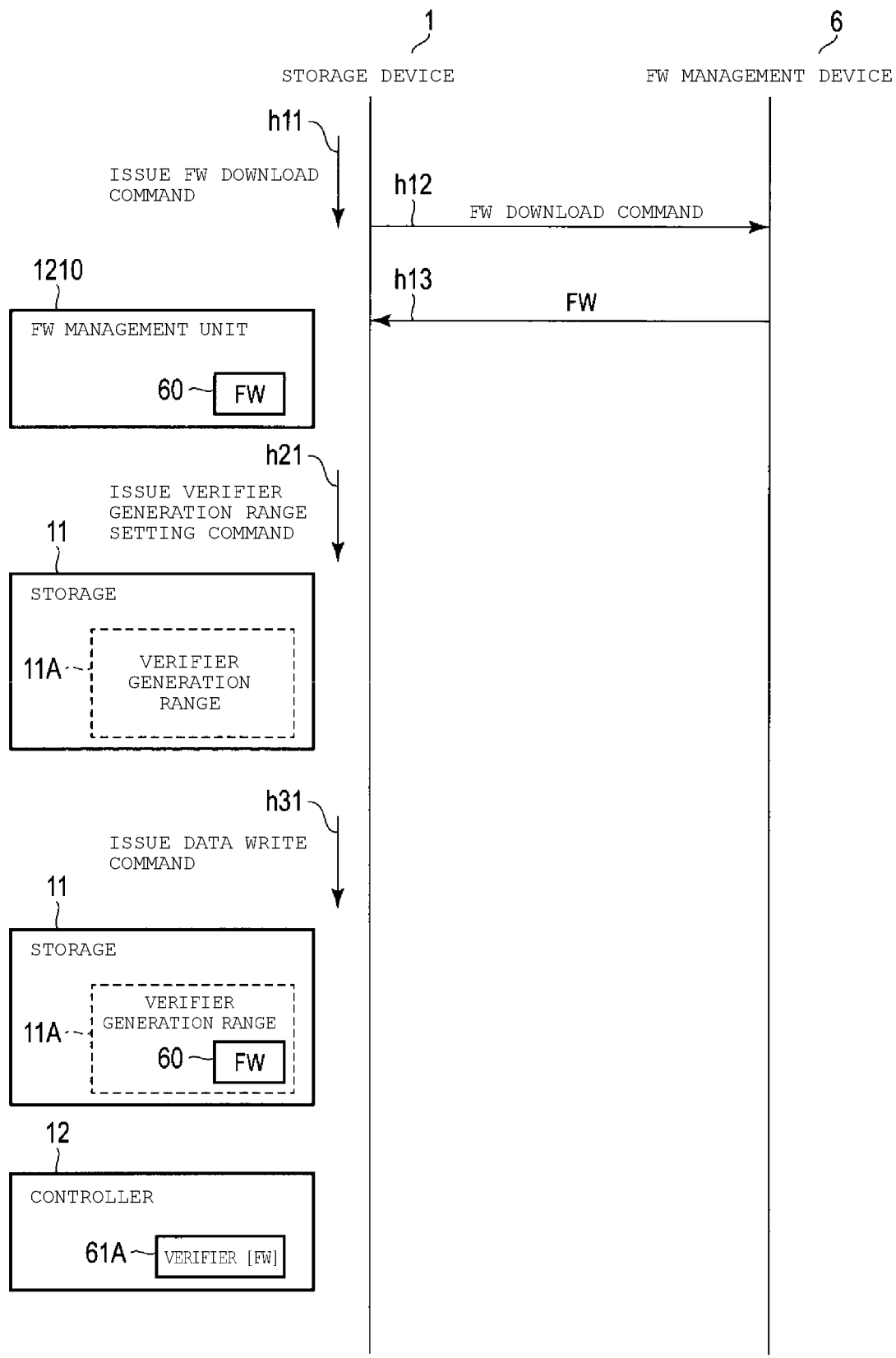
FIG. 25 is a first diagram for explaining a flow of processing when downloading a firmware of the storage device of the fourth embodiment.
Figure 26:
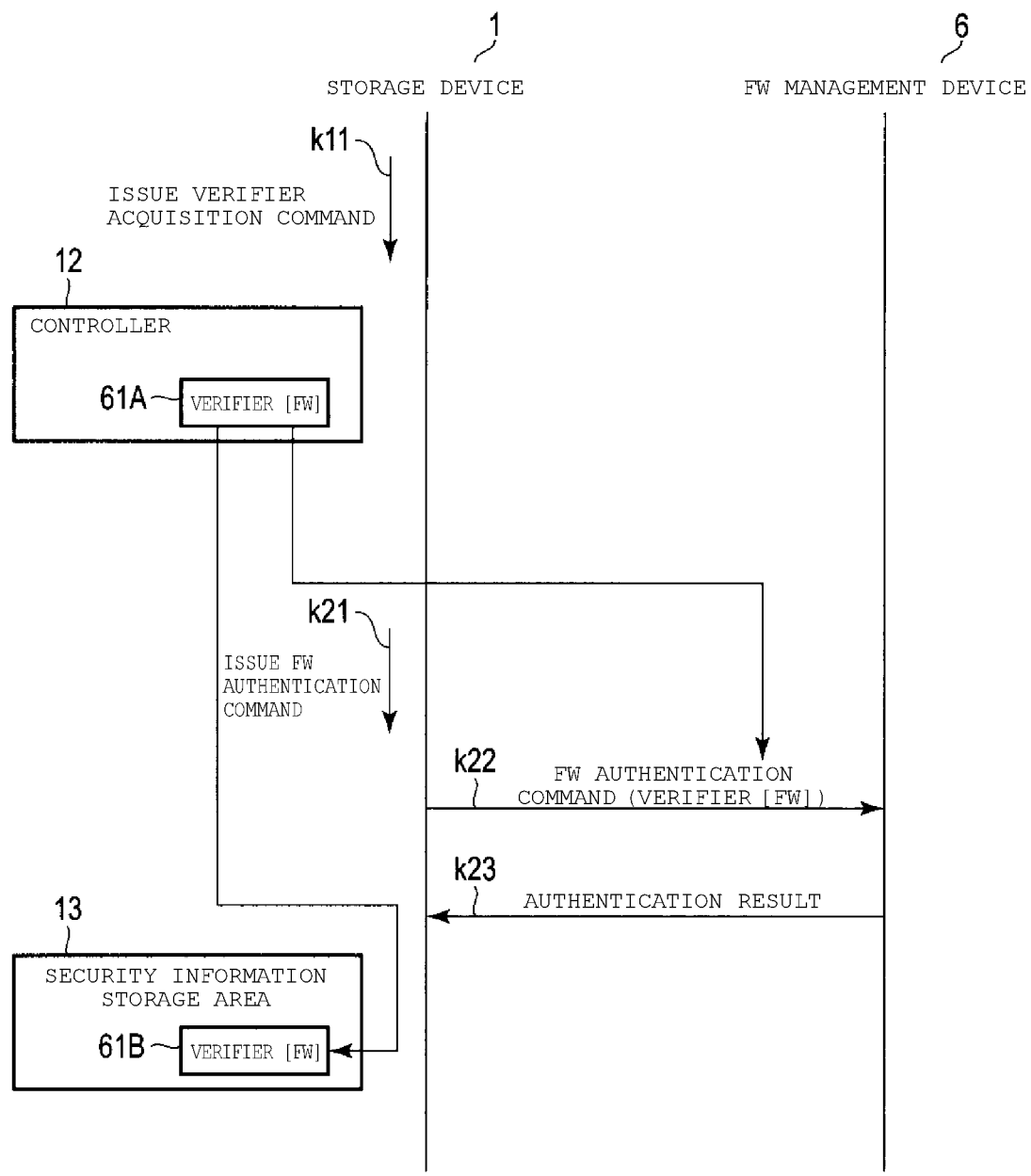
FIG. 26 is a second diagram for explaining the flow of processing when downloading the firmware of the storage device of the fourth embodiment.

In the fourth embodiment, the storage device 1 executes processing relating to verification of the FW downloaded from the FW management device 6, including issuances of FW download command and FW authentication command. With reference to FIG. 25 and FIG. 26, a flow of processing of the storage device 1 when downloading FW will be described. Here, it is assumed that the storage device 1 downloads the FW from the FW management device 6, but the host CPU 2 may download the FW from the FW management device 6, and the FW may be transferred from the host CPU 2 to the storage device 1. That is, issuance of the FW download command by the storage device 1 may be replaced with an alternative step.

In the case of downloading the FW, the storage device 1 issues an FW download command to the FW management device 6 (h11 and h12 in FIG. 25). The FW management device 6 which received the FW download command transmits the FW to the storage device 1 (h13 in FIG. 25). The FW (e.g., FW 60) transmitted from the FW management device 6 is first stored, for example, in an area allocated in a memory of the controller 12 by the FW management unit 1210.

The FW management unit 1210 issues a verifier generation range setting command for setting the area of the storage 11 to which the FW is to be written into the verifier generation range to the command input-and-output unit 126 (h21 in FIG. 25). When the verifier generation range 11A is set, the FW management unit 1210 issues a data write command for writing the FW into the verifier generation range 11A to the command input-and-output unit 126 (h31 in FIG. 25). Then, the FW is written into the storage 11, and a verifier (e.g., verifier [FW] 61) of the FW is generated. This verifier is stored in the verifier generation unit 121 of the controller 12.

Next, the FW management unit 1210 issues a verifier acquisition command to the command input-and-output unit 126 (k11 in FIG. 26), and acquires the verifier of the FW from the controller 12. The FW management unit 1210 requests the command input-and-output unit 126 to issue an FW authentication command requesting FW authentication using the acquired verifier to the FW management device 6 (k21 in FIG. 26). The command input-and-output unit 126 which received the request issues an FW authentication command with the verifier of the FW acquired from the controller 12, for example, as a parameter or the like to the FW management device 6 (k22 in FIG. 26). When the FW authentication command is received, the FW management device 6 authenticates the verifier of the FW attached as, for example, a parameter or the like, and transmits the result to the storage device 1 (k23 in FIG. 26).

When the result received from the FW management device 6 indicates successful authentication of the verifier of the FW, the FW management unit 1210 determines that the downloaded FW is not tampered with, and stores the verifier of the FW generated when writing into the storage 11 in the security information storage area 13 (verifier [FW] 61B).

Figure 27:
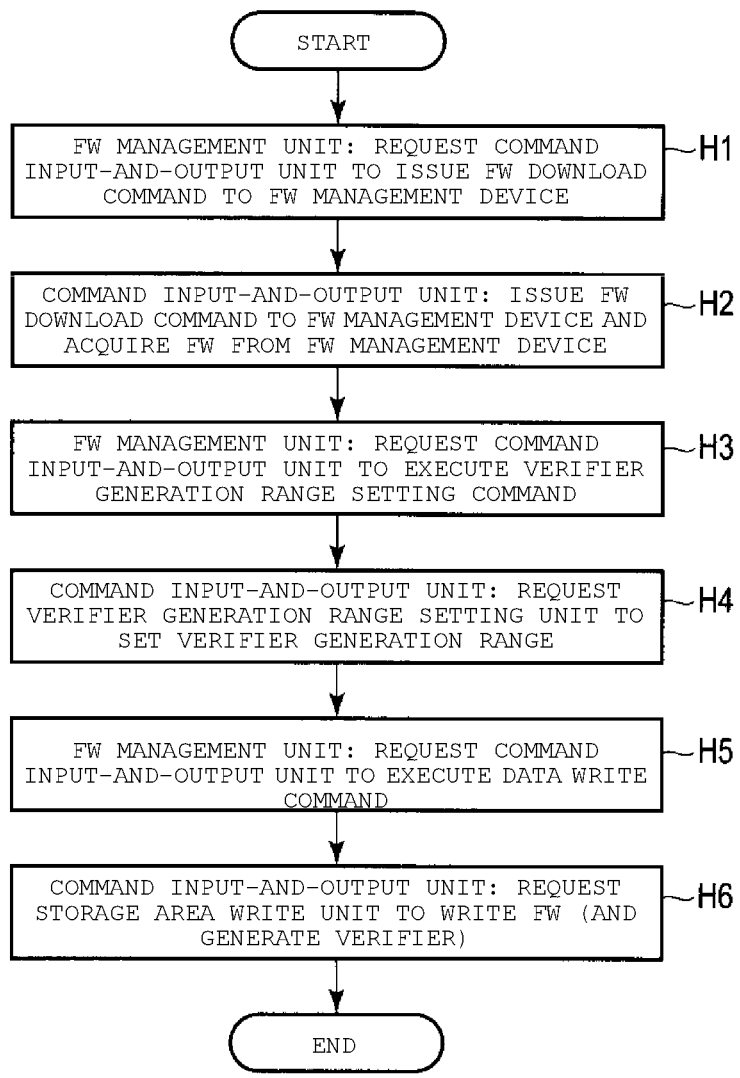
FIG. 27 is a flowchart illustrating a processing procedure until data is stored in the storage device when downloading the firmware of the storage device of the fourth embodiment.

FIG. 27 is a flowchart illustrating a processing procedure until data is stored in the storage 11 when downloading the FW of the storage device 1.

The FW management unit 1210 requests the command input-and-output unit 126 to issue a FW download command to the FW management device 6 (Step H1). The command input-and-output unit 126 which received the request issues the FW download command to the FW management device 6, and acquires the FW from the FW management device 6 (Step H2).

Next, the FW management unit 1210 requests the command input-and-output unit 126 to execute a verifier generation range setting command (Step H3). The command input-and-output unit 126 which received the request, requests the verifier generation range setting unit 124 to set the verifier generation range, similarly as in the case where the verifier generation range setting command is received from the host CPU 2 (Step H4).

Subsequently, the FW management unit 1210 requests the command input-and-output unit 126 to execute a data write command (Step H5). The command input-and-output unit 126 which received the request, requests the storage area write unit 127 to write the FW, similarly as in the case where the data write command is received from the host CPU 2 (Step H6). At this time, a verifier is generated.

Figure 28:
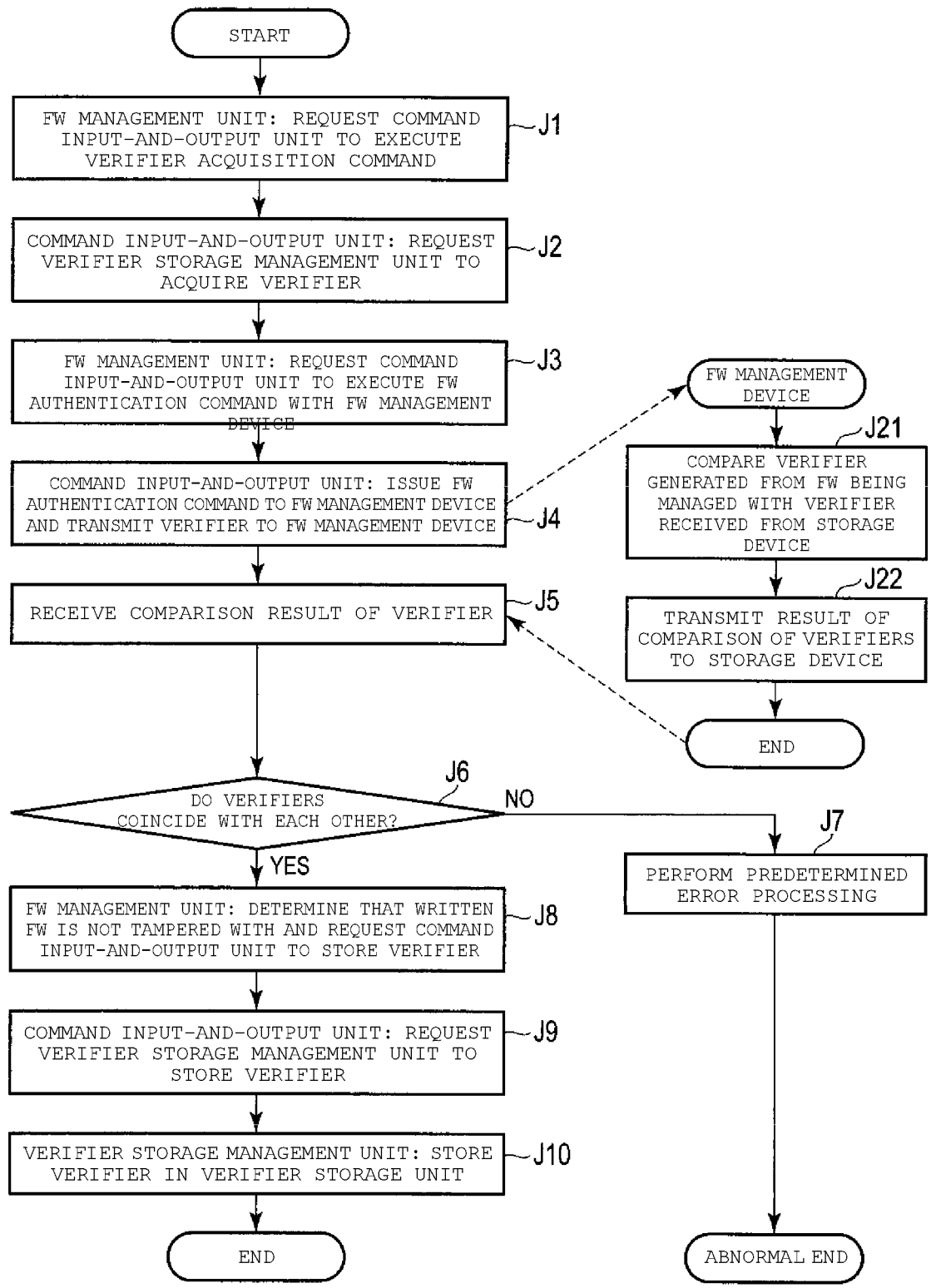
FIG. 28 is a flowchart illustrating a processing procedure of firmware authentication when downloading the firmware of the storage device of the fourth embodiment.

FIG. 28 is a flowchart illustrating a processing procedure of FW authentication in downloading the FW of the storage device 1.

The FW management unit 1210 requests the command input-and-output unit 126 to execute a verifier acquisition command (Step J1). The command input-and-output unit 126 which received the request requests the verifier storage management unit 125 to acquire the verifier, similarly as in the case where the verifier acquisition command is received from the host CPU 2 (Step J2).

Next, the FW management unit 1210 requests the command input-and-output unit 126 to execute a FW authentication command with the FW management device 6 (Step J3). The command input-and-output unit 126 which received the request issues the FW authentication command to the FW management device 6 and transmits the verifier to the FW management device 6 (Step J4).

The FW management device 6 which received the FW authentication command compares the verifier generated from the FW being managed with the verifier received from the storage device 1 (Step J21). The FW management device 6 transmits the results of comparison of the verifiers to the storage device 1 (Step J22).

The FW management unit 1210 receives the result of comparison of the verifiers from the FW management device 6. When the verifiers do not coincide with each other (NO in Step J6), the FW management unit 1210 determines that the FW is tampered with, and performs predetermined error processing (Step J7) and abnormally ends the storage device 1. As the predetermined error processing, the FW management unit 1210 performs, for example, deletion of the stored FW or the like.

When the verifiers coincide with each other (YES in Step J6), the FW management unit 1210 determines that the FW written in the storage 11 is not tampered with, and requests the command input-and-output unit 126 to store the verifier (Step J8). The command input-and-output unit 126 which received the request requests the verifier storage management unit 125 to store the verifier (Step J9). The verifier storage management unit 125 stores the verifier in the verifier storage unit 131 (Step J10).

As such, in the storage device 1 of the fourth embodiment, reduction in the load on the host CPU 2 relating to verification of the FW is achieved.

Here, verification of the FW is assumed, but verification can be applied not only to the FW but also to verification of data.

Fifth Embodiment

Next, a fifth embodiment will be described. The same reference numerals are used for the same elements as those in the first to fourth embodiments, and redundant descriptions thereof will be omitted.

Figure 29:
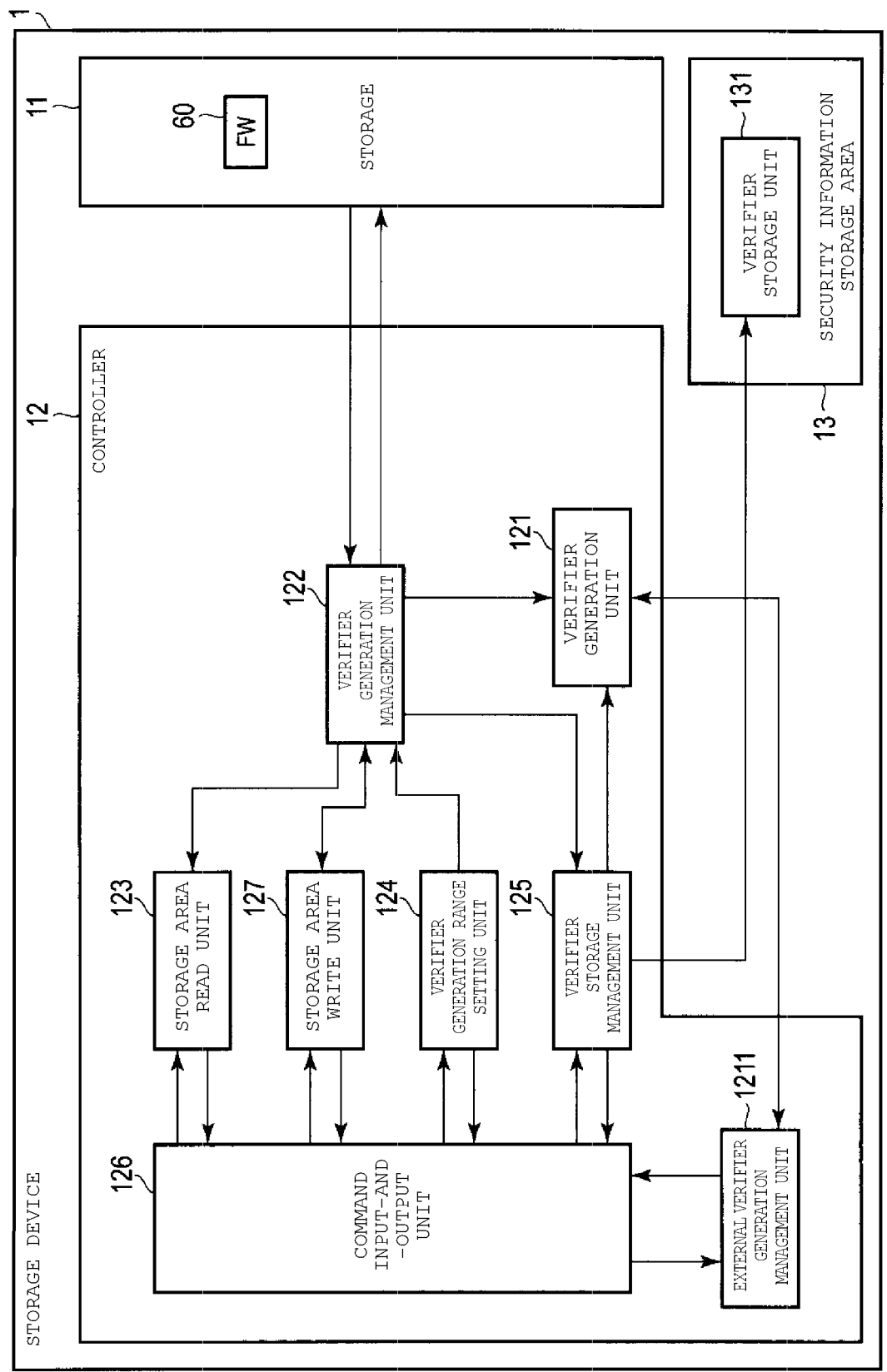
FIG. 29 is a block diagram illustrating a functional configuration of a storage device of a fifth embodiment.

FIG. 29 is a block diagram illustrating a functional configuration of a storage device of the fifth embodiment.

As illustrated in FIG. 29, the storage device 1 of the fifth embodiment includes an external verifier generation management unit 1211. As illustrated in FIG. 29, the external verifier generation management unit 1211 may be a part of the controller 12 or may be implemented as one or a plurality of SoCs or one or a plurality of ASICs different from the controller 12. Also, in FIG. 29 and succeeding figures, although the external verifier generation management unit 1211 is illustrated as a part of the controller 12, as described above, may be implemented as one or a plurality of SoCs or one or a plurality of ASICs different from the controller 12. For example, the external verifier generation management unit 1211 may be implemented by executing a program stored in a memory incorporated in the controller 12 by a processor incorporated in the controller 12, by executing a program stored in a memory incorporated in an SoC different from the controller 12 by a processor incorporated in the SoC, or by executing a program stored in a memory incorporated in an ASIC different from the controller 12 by a processor incorporated in the ASIC, or may be implemented as a dedicated integrated circuit. That is, the external verifier generation management unit 1211 can be implemented by software or hardware. Also, a part of the external verifier generation management unit 1211 may be implemented by software, and the remaining parts of the external verifier generation management unit 1211 may be implemented by hardware. The storage device 1 of the fifth embodiment may include the external verifier generation management unit 1211 together with the FW management unit 1210 described in the fourth embodiment or may include the external verifier generation management unit 1211 in place of the FW management unit 1210. When the storage device 1 includes the external verifier generation management unit 1211 together with the FW management unit 1210 and when the external verifier generation management unit 1211 and the FW management unit 1210 are included in SoCs or ASICs different from the controller 12, the SoCs or ASICs implementing the external verifier generation management unit 1211 and the SoCs or ASICs implementing the FW management unit 1210 may be the same or different from each other.

In response to a request from the host CPU 2, the storage device 1 of the fifth embodiment executes processing relating to verification of the FW load into the RAM 3. Specifically, the storage device 1 further executes processing of an external verifier generation command. The external verifier generation management unit 1211 is provided in the controller 12 for this processing. Here, a verifier of data in the RAM 3 outside the storage device 1 is called an external verifier.

Figure 30:
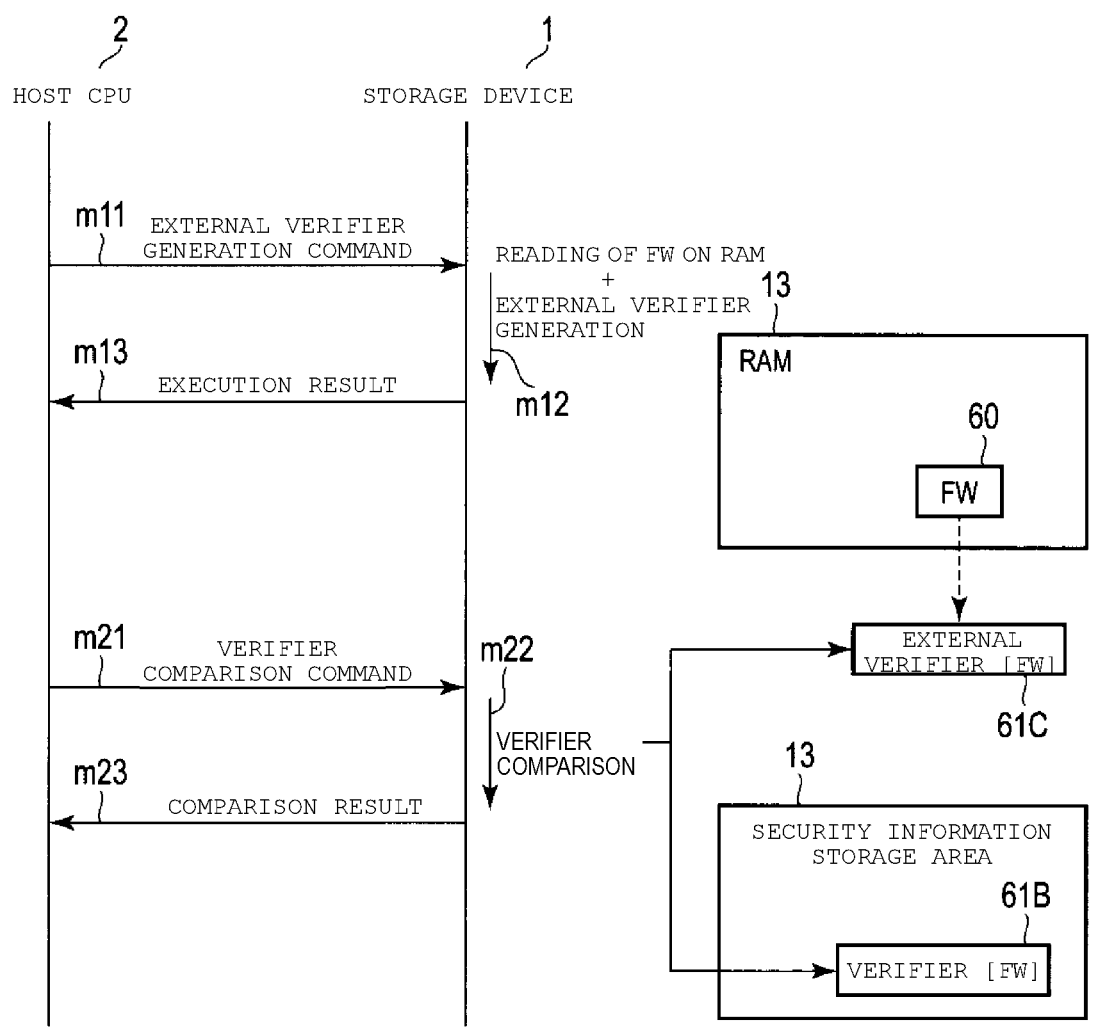
FIG. 30 is a diagram for explaining a flow of data tampering detection in the storage device of the fifth embodiment.

With reference to FIG. 30, a flow of processing by the storage device 1 and the host CPU 2 for verification of FW, including issuance of the external verifier generation command, will be described.

First, the host CPU 2 issues the external verifier generation command to the storage device 1 (m11). In this command, information indicating a storage area of the FW in the RAM 3 is attached as a parameter, for example. The storage device 1 which received the external verifier generation command generates a verifier (e.g., external verifier [FW] 61C) of the FW (e.g., FW 60) in the RAM 3 (m12). The storage device 1 responds to the host CPU 2 that the external verifier is generated (m13).

After the external verifier is generated, the host CPU 2 next issues a verifier comparison command to the storage device 1 (m21). When the verifier comparison command is received, the storage device 1 compares the external verifier generated when receiving the external verifier generation command and the verifier stored in the security information storage area 13 (m22) generated when the FW is stored in the storage 11, and transmits the comparison result to the host CPU 2 (m23).

With this configuration, the host CPU 2 can perform verification of the FW in the RAM 3 only by issuing the external verifier generation command and the verifier comparison command. Since the generation and comparison of the verifier of the FW are performed by the storage device 1, the load on the host CPU 2 relating to verification of the FW in the RAM 3 can be reduced.

Figure 31:
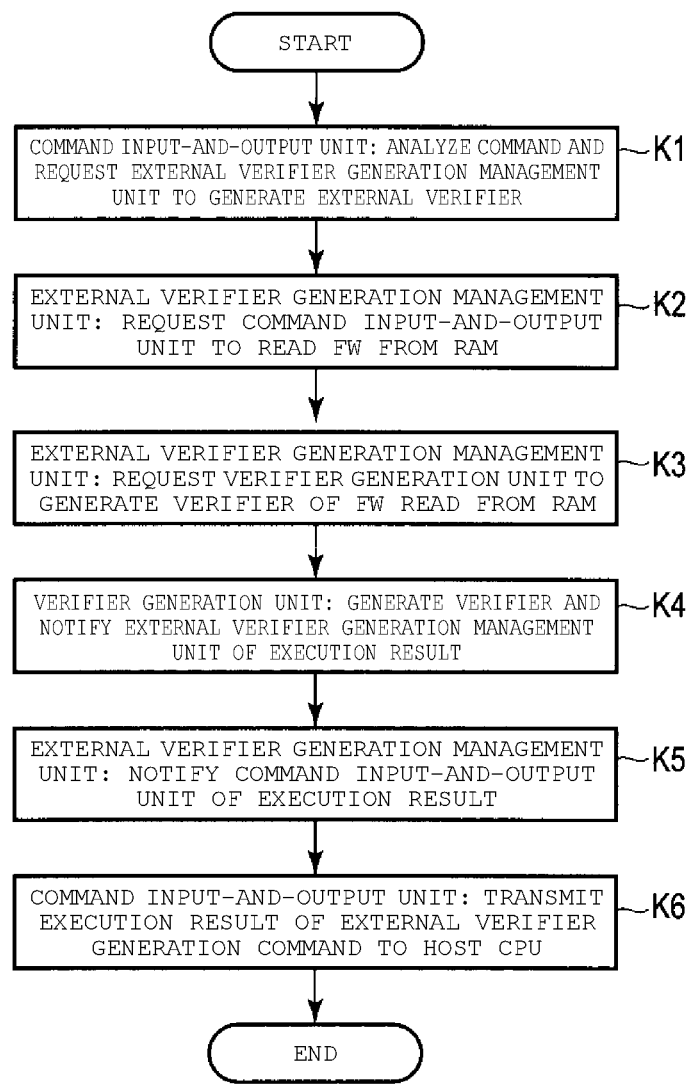
FIG. 31 is a diagram for explaining a flow of processing when receiving an external verifier generation command in the storage device of the fifth embodiment.

FIG. 31 is a flowchart illustrating a processing procedure when receiving the external verifier generation command in the storage device 1.

When the external verifier generation command is received, the command input-and-output unit 126 analyzes the command and requests the external verifier generation management unit 1211 to generate an external verifier (Step K1). The external verifier generation management unit 1211 which received the request requests the command input-and-output unit 126 to read the FW from the RAM 3 (Step K2), and requests the verifier generation unit 121 to generate a verifier of the FW read from the RAM 3 (Step K3). The verifier generation unit 121 generates the verifier and notifies the external verifier generation management unit 1211 of the execution result (Step K4). The execution result indicates that the verifier is generated.

The external verifier generation management unit 1211 notifies the command input-and-output unit 126 of the execution result (Step K5), and the command input-and-output unit 126 transmits the execution result of the external verifier generation command to the host CPU 2 (Step K6).

Figure 32:
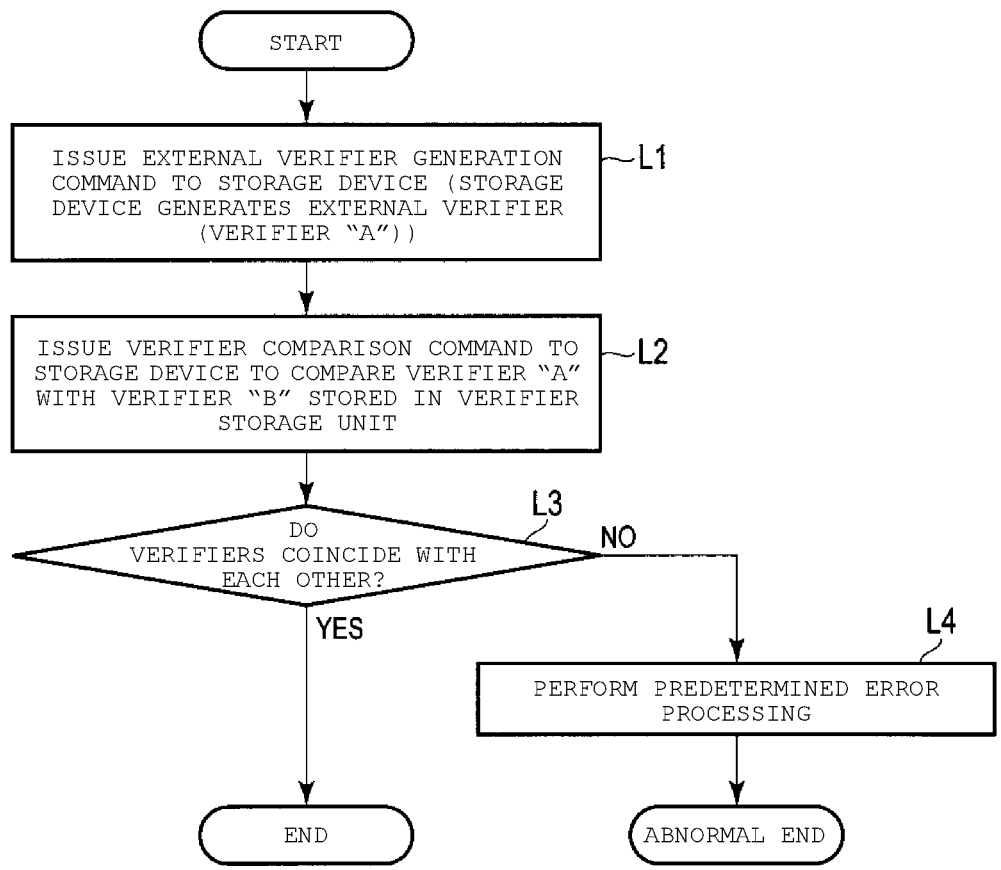
FIG. 32 is a flowchart illustrating a processing procedure in a case where the host CPU performs verification of the firmware stored in the storage device of the fifth embodiment.

On the other hand, FIG. 32 is a flowchart illustrating a processing procedure in a case where the host CPU 2 performs verification of the FW stored in the storage device 1.

The host CPU 2 issues the external verifier generation command to the storage device 1 (Step L1). With this configuration, the verifier of the FW in the RAM 3 is generated in the storage device 1. This verifier is referred to as a verifier A.

The host CPU 2 issues a verifier comparison command to the storage device 1 and compares the verifier A generated by executing the external verifier generating command and the verifier stored in the verifier storage unit 131 (this verifier is referred to as a verifier B) which is generated when the FW is stored in the storage 11 (Step L2). When the verifiers coincide with each other (YES in Step L3), the host CPU 2 determines that the FW in the RAM 3 is not tampered with, and ends the verification. On the other hand, in a case where the verifiers do not coincide with each other (NO in Step L3), the host CPU 2 determines that the FW in the RAM 3 has been tampered with, performs predetermined error processing (Step D8), and abnormally ends the processing.

As such, in the storage device 1 of the fifth embodiment in which the generation and comparison of the verifier are executed, reduction in the load on the host CPU 2 relating to verification of the FW in the RAM 3 is achieved. Here, verification of the FW is assumed, but is not limited to the FW, and the verification described above can also be applied to data.

Sixth Embodiment

Next, a sixth embodiment will be described. The same reference numerals are used for the same elements as those in the first to fifth embodiments, and redundant descriptions thereof will be omitted.

Figure 33:
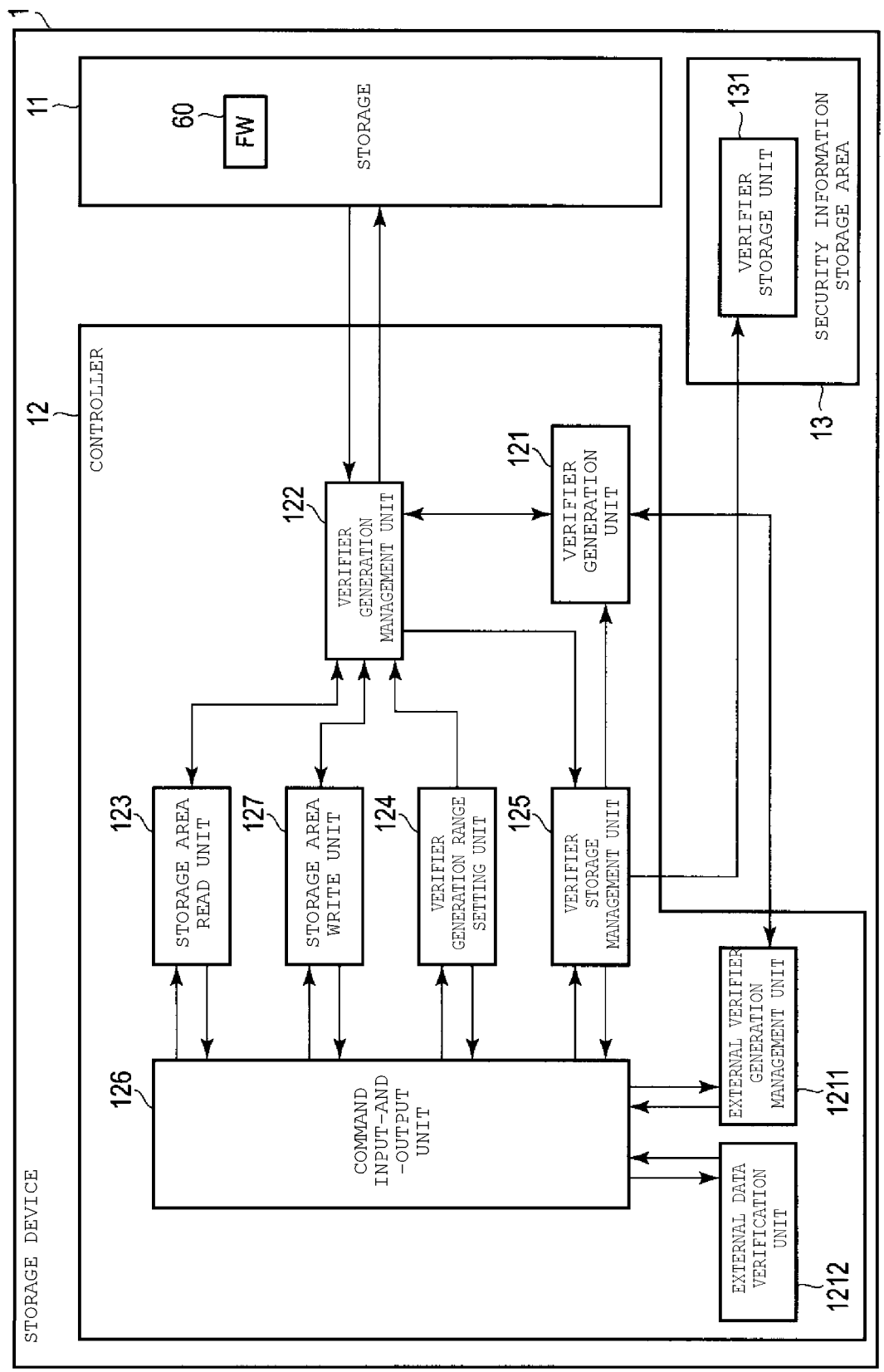
FIG. 33 is a block diagram illustrating a functional configuration of a storage device of a sixth embodiment.

FIG. 33 is a block diagram illustrating a functional configuration of the storage device 1 of the sixth embodiment.

As illustrated in FIG. 33, the storage device 1 of the sixth embodiment further includes an external data verification unit 1212, in addition to the external verifier generation management unit 1211 described in the fifth embodiment. As illustrated in FIG. 33, the external data verification unit 1212 may be a part of the controller 12 or may be implemented as one or a plurality of SoCs or one or a plurality of ASICs different from the controller 12. For example, the external data verification unit 1212 may be implemented by executing a program stored in a memory incorporated in the controller 12 by a processor incorporated in the controller 12, by executing a program stored in a memory incorporated in an SoC different from the controller 12 by a processor incorporated in the SoC, or by executing a program stored in a memory incorporated in an ASIC different from the controller 12 by a processor incorporated in the ASIC, or may be implemented as a dedicated integrated circuit. That is, the external data verification unit 1212 can be implemented by software or hardware. Also, a part of the external data verification unit 1212 may be implemented by software, and the remaining parts of the external data verification unit 1212 may be implemented by hardware. When the external verifier generation management unit 1211 and the external data verification unit 1212 are included in the SoCs or ASICs different from the controller 12, the SoCs or ASICs implementing the external verifier generation management unit 1211 and the SoCs or the ASICs implementing the external data verification unit 1212 may be same or different from each other. The storage device 1 of the sixth embodiment may or may not include the FW management unit 1210 described in the fourth embodiment. When the storage device 1 includes the external verifier generation management unit 1211 and the external data verification unit 1212 together with the FW management unit 1210 and at least either of the external verifier generation management unit 1211 or the external data verification unit 1212 and the FW management unit 1210 are included in the SoCs or ASICs different from the controller 12, the SoCs or ASICs implementing at least either of the external verifier generation management unit 1211 or the external data verification unit 1212 and the SoCs or ASICs implementing the FW management unit 1210 may be the same or different from each other.

The storage device 1 of the sixth embodiment automatically executes processing relating to verification of the FW read onto the RAM 3 at any timing such as every predetermined interval. For example, in a case where processing relating to verification of the FW in the RAM 3 is executed in response to a request from the host CPU 2, more specifically, in response to the external verifier generation command or the verifier comparison command issued by the host CPU 2, if the host CPU 2 is deprived of control by a malicious FW, there is a concern that the processing cannot be performed. Accordingly, the storage device 1 of the sixth embodiment provides a method of automatically detecting tampering of an FW. The external data verification unit 1212 is provided in the controller 12 for automatic tampering detection of the FW.

Figure 34:
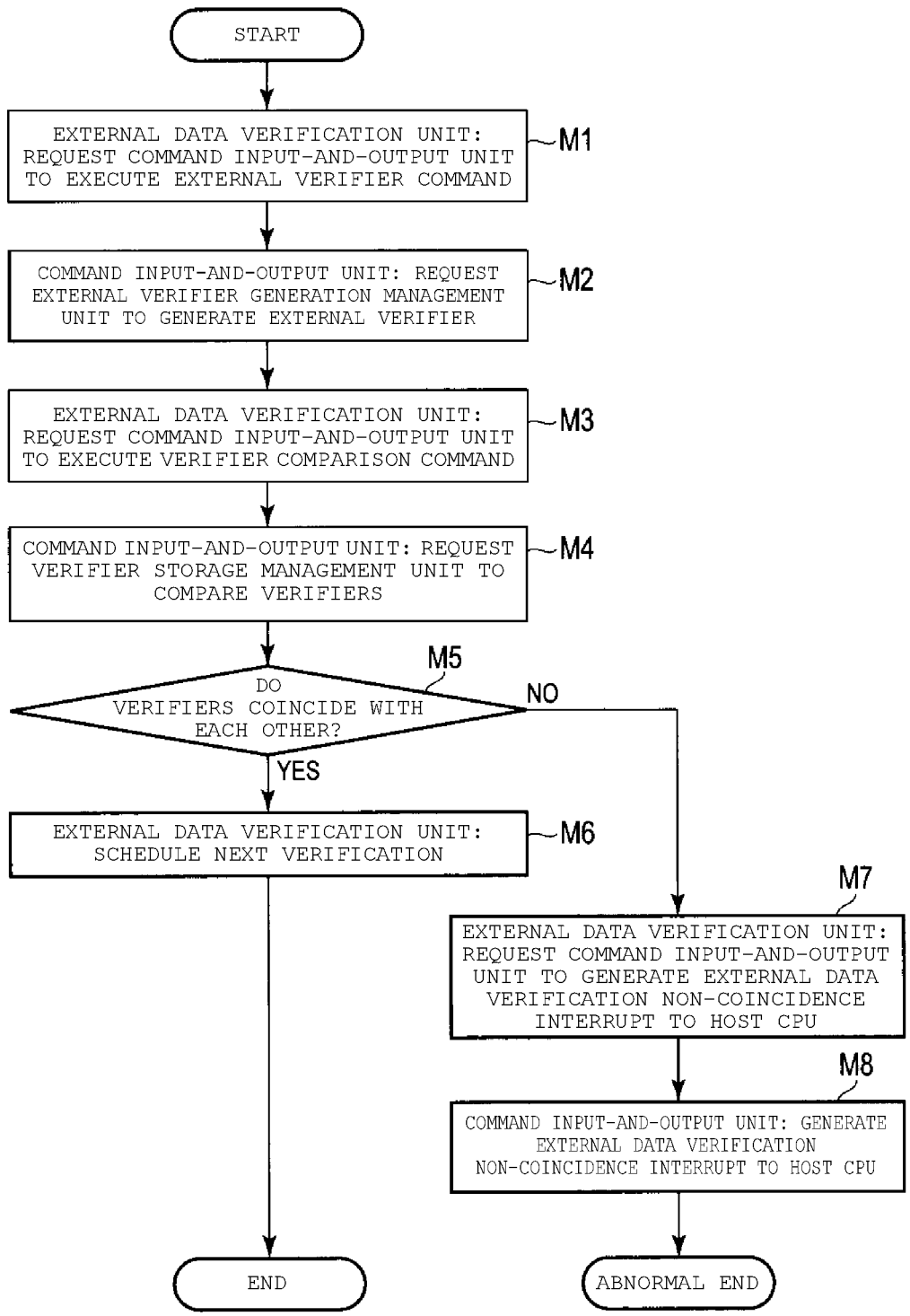
FIG. 34 is a flowchart illustrating a processing procedure of automatic detection of firmware tampering in the storage device of the sixth embodiment.

FIG. 34 is a flowchart illustrating a processing procedure of FW automatic tampering detection of the storage device 1.

The external data verification unit 1212 requests the command input-and-output unit 126 to execute the external verifier command (Step M1). The command input-and-output unit 126 which received the request requests the external verifier generation management unit 1211 to generate the external verifier similarly as in the case of receiving the external verifier command from the host CPU 2 (Step M2).

Next, the external data verification unit 1212 requests the command input-and-output unit 126 to execute the verifier comparison command (Step M3). The command input-and-output unit 126 which received the request requests the verifier storage management unit 125 to check the verifiers, more specifically, to compare the verifiers with each other similarly as in the case of receiving the verifier comparison command from the host CPU 2 (Step M4).

In a case where the verifiers coincide with each other (YES in Step M5), the external data verification unit 1212 schedules next verification (Step M6). The schedule for the next verification may be achieved by any method, for example, it may be achieved by timer interrupts generated by a Watchdog Timer.

On the other hand, in a case where the verifiers do not coincide with each other (NO in Step M5), the external data verification unit 1212 requests the command input-and-output unit 126 to generate an external data verification non-coincidence interrupt to the host CPU 2 (Step M7). The external data verification non-coincidence interrupt is an interrupt for informing a state where, for example, the verifier generated from the FW in the RAM 3 and the verifier having been generated in downloading the FW do not coincide with each other. The command input-and-output unit 126 which received the request causes the host CPU 2 to generate the external data verification non-coincidence interrupt (Step M8), and abnormally ends the storage device 1. When the storage device 1 is abnormally ended, the external data verification unit 1212, for example, locks the storage device 1 to be unreadable and unwritable. When the storage device 1 is to notify a predetermined external device other than the host CPU 2 of an alert of tampering detection, notification of the alert is executed.

As such, in the storage device 1 of the sixth embodiment that executes automatic tampering detection of the FW, for example, even if the host CPU 2 falls into a situation where it is not possible to issue the external verifier generation command or the verifier comparison command, it is possible to detect tampering of the FW.

Here, tampering detection of the FW is assumed, but is not limited to the FW, and matters described above can also be applied to tampering detection of data.

Figure 35:
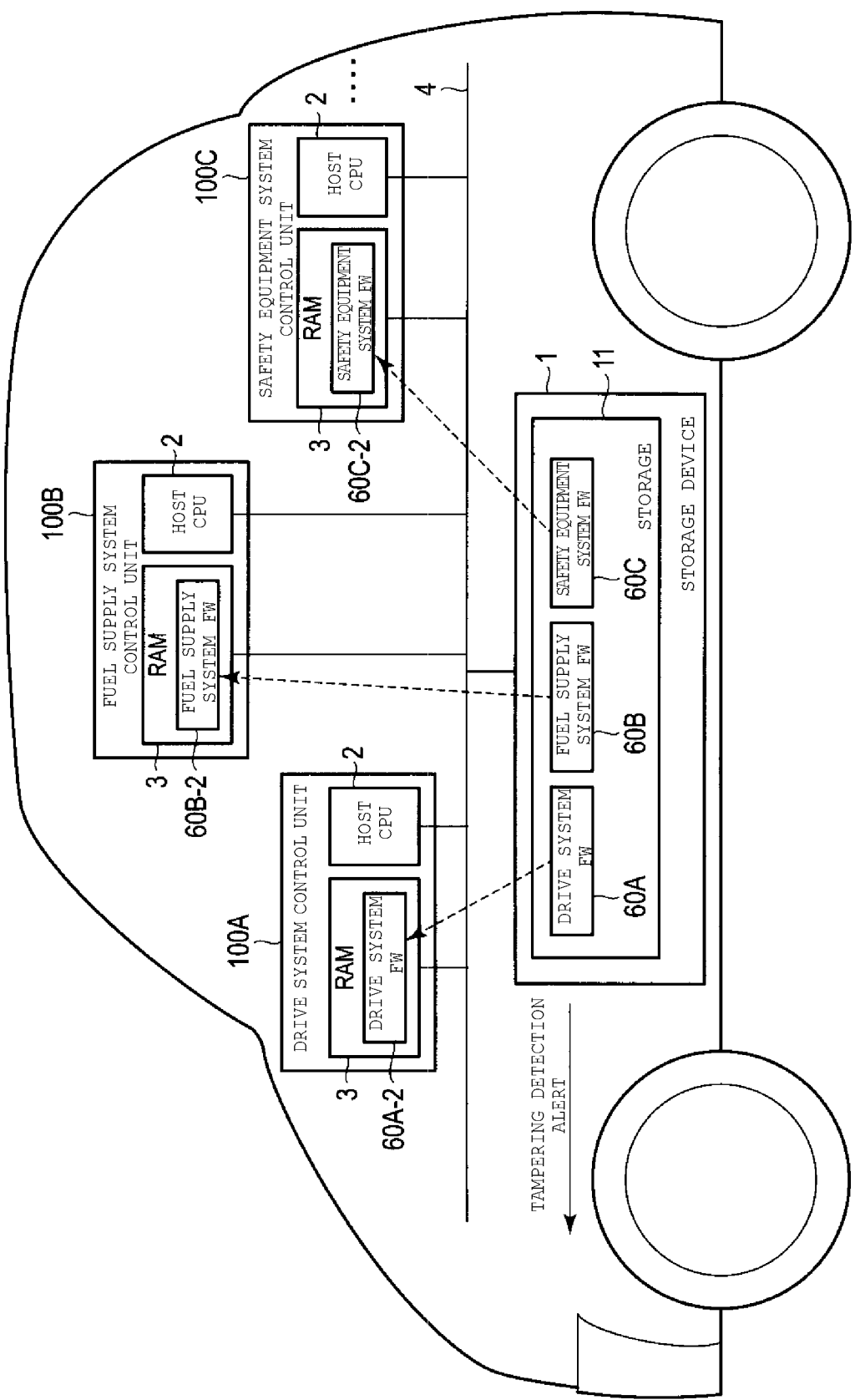
FIG. 35 is a diagram illustrating an application example of the storage device of the first to sixth embodiments.

Several embodiments have been described as above. FIG. 35 illustrates one application example of the storage device 1 of these embodiments.

FIG. 35 is a diagram conceptually illustrating a vehicle in which various mechanisms are electronically controlled. As illustrated in FIG. 35, this vehicle is mounted with various control units 100 such as a drive system control unit 100A, a fuel supply system control unit 100B, a safety equipment system control unit 100C, and the like. The control unit 100 will be used as a general name of the drive system control unit 100A, the fuel supply system control unit 100B, the safety equipment system control unit 100C, and the like.

Each control unit 100 such as an SoC includes the host CPU 2 and the RAM 3. The host CPU 2 and the RAM 3 of each control unit 100 are connected to the storage device 1 via the bus 4. The host CPU 2 of the drive system control unit 100A loads a drive system FW 60A from the storage device 1 onto the RAM 3 and executes the drive system FW 60A, the host CPU 2 of the fuel supply system control unit 100B loads a fuel supply system FW 60B from the storage device 1 onto the RAM 3 and executes the fuel supply system FW 60B, and the host CPU 2 of the safety equipment system control unit 100C loads a safety equipment FW 60C from the storage device 1 onto the RAM 3 and executes the safety equipment FW 60C.

For example, if a drive system FW 60A-2 loaded into the RAM 3 of the drive system control unit 100A is tampered with, the drive system control unit 100A cannot achieve targeted electronic control, if a fuel supply system FW 60B-2 loaded onto the RAM 3 of the fuel supply system control unit 100B is tampered with, the fuel supply system control unit 100B cannot achieve targeted electronic control, and if a safety equipment FW 60C-2 of the safety equipment system control unit 100C is tampered with, the safety equipment system control unit 100C cannot achieve targeted electronic control.

Some of the storage devices 1 described achieve detection of such tampering while reducing the load on the control unit 100 side and achieve specifying at which timing or in which section the tampering has occurred.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a first storage;
a second storage; and
a controller configured to execute control of the first storage based on a command from a host device,
wherein the controller is configured to:
in response to a first command from the host device, the first command being a write command including first firmware, write the first firmware included in the first command into the first storage, generate a first verifier of the first firmware included in the first command, and store the generated first verifier in the second storage;
in response to a second command related to the first firmware from the host device, transmit the first verifier to the host device;
in response to a third command from the host device, the third command being a read command to read the first firmware stored in the first storage, read the first firmware from the first storage and generate a second verifier of the first firmware read from the first storage;
in response to a fourth command related to the first firmware from the host device, compare the first verifier stored in the second storage and the generated second verifier and transmit a first comparison result of comparison between the first verifier and the second verifier to the host device;
in response to a fifth command from the host device, transmit the second verifier to the host device;
without responding to any command from the host device, download the first firmware from an external device different from the host device, store the downloaded first firmware in the first storage, generate a third verifier of the downloaded first firmware, and store the generated third verifier in the second storage;
at a predetermined timing, without responding to any command from the host device, read, from an external memory that is connected to the host device and the storage device, the first firmware that has been loaded to the external memory, generate a fourth verifier of the first firmware read from the external memory, and compare the third verifier stored in the second storage with the generated fourth verifier;

when a second comparison result of comparison between the third verifier and the fourth verifier indicates coincidence between the third verifier and the fourth verifier, schedule a next timing at which comparison of the third verifier and the fourth verifier is performed; and when the second comparison result indicates non-coincidence between the third verifier and the fourth verifier, notify a predetermined external device different from the host device of the non-coincidence and disable writing into the first storage and reading from the first storage.

2. The storage device of claim 1, wherein the controller is further configured to:

set a range of storage areas within the first storage as designated by a sixth command from the host device as a generation range; and in response to the first command, generate the first verifier only after confirming that the first data is stored within the generation range.

3. The storage device of claim 1, wherein the controller further includes:

an encryption circuit configured to encrypt data to be written into the first storage; and a decryption circuit configured to decrypt the data which is encrypted by the encryption unit and read from the first storage.

4. The storage device of claim 2, wherein the controller is further configured to store the downloaded first firmware within the generation range of the first storage.

5. A method of detecting tampering of data in a first storage connected to a host device, said method comprising:

in response to a first command from the host device, the first command being a write command including first firmware, write the first firmware included in the first command into the first storage, generating a first verifier of the first firmware included in the first command, and storing the generated first verifier in a second storage connected to the host device;

in response to a second command related to the first firmware from the host device transmitting the first verifier to the host device;

in response to a third command from the host device, the third command being a read command to read the first firmware stored in the first storage, reading the first firmware from the first storage and generating a second verifier of the first firmware read from the first storage;

in response to a forth command related to the first firmware from the host device, comparing the first verifier stored in the second storage and the generated second verifier and transmitting a first comparison result of comparison between the first verifier and the second verifier to the host device;

in response to a fifth command from the host device, transmitting the second verifier to the host device;

without responding to any command from the host device, downloading the first firmware from an external device different from the host device, storing the downloaded first firmware in the first storage, generating a third verifier of the downloaded first firmware, and storing the generated third verifier in the second storage;

at a predetermined timing, without responding to any command from the host device, reading, from an external memory that is connected to the host device and the storage device, the first firmware that has been loaded to the external memory, generating a fourth verifier of the first firmware read from the external memory, and comparing the third verifier stored in the second storage with the generated fourth verifier;

when a second comparison result of comparison between the third verifier and the fourth verifier indicates coincidence between the third verifier and the fourth verifier, scheduling a next timing at which comparison of the third verifier and the fourth verifier is performed; and when the second comparison result indicates non-coincidence between the third verifier and the fourth verifier, notifying a predetermined external device different from the host device of the non-coincidence and disabling writing into the first storage and reading from the first storage.

6. The method of claim 5, further comprising:

setting a range of storage areas within the first storage as designated by a sixth command from the host device as a generation range, wherein the first verifier is generated in response to the first command only after confirming that the first data is stored within the generation range.

7. The method of claim 5, further comprising:

encrypting data to be written into the first storage; and decrypting the data which has been encrypted and read from the first storage.

* * * * *

UNITED STATES PATENT AND TRADEMARK OFFICE
CERTIFICATE OF CORRECTION

| | |
|---|---|
| PATENT NO. | : 11,853,464 B2 |
| APPLICATION NO. | : 16/425805 |
| DATED | : December 26, 2023 |
| INVENTOR(S) | : Naoko Yamada et al. |

Page 1 of 1

It is certified that error appears in the above-identified patent and that said Letters Patent is hereby corrected as shown below:

In the Claims

Column 22, Line 4, delete "forth" and insert --fourth--.

Signed and Sealed this
Twenty-ninth Day of July, 2025

Coke Morgan Stewart
*Acting Director of the United States Patent and Trademark Office*